US012600164B2

(12) United States Patent
Von Czarnowski et al.

(10) Patent No.: US 12,600,164 B2
(45) Date of Patent: Apr. 14, 2026

(54) DELTA WHEEL

(71) Applicant: DELTA WHEELS, LLC, Orchard Lake, MI (US)

(72) Inventors: Armin Von Czarnowski, Orchard Lake, MI (US); Peter Von Czarnowski, Orchard Lake, MI (US); Dirk Uffelmann, Ering (DE)

(73) Assignee: DELTA WHEELS, LLC, Orchard Lake, MI (US)

( * ) Notice: Subject to any disclaimer, the term of this patent is extended or adjusted under 35 U.S.C. 154(b) by 770 days.

(21) Appl. No.: 17/427,575

(22) PCT Filed: Jan. 31, 2020

(86) PCT No.: PCT/US2020/016236

§ 371 (c)(1),
(2) Date: Jul. 30, 2021

(87) PCT Pub. No.: WO2020/160487

PCT Pub. Date: Aug. 6, 2020

(65) Prior Publication Data

US 2022/0105746 A1 Apr. 7, 2022

Related U.S. Application Data

(60) Provisional application No. 62/860,103, filed on Jun. 11, 2019, provisional application No. 62/800,125, filed on Feb. 1, 2019.

(51) Int. Cl.
*B60B 1/14* (2006.01)
*B60B 1/08* (2006.01)
(Continued)

(52) U.S. Cl.
CPC .................. *B60B 1/14* (2013.01); *B60B 1/08* (2013.01); *B60B 3/02* (2013.01); *B60B 3/12* (2013.01);
(Continued)

(58) Field of Classification Search
CPC ........... B60B 21/08; B60B 21/14; B60B 3/02; B60B 3/06; B60B 3/12; B60B 21/06;
(Continued)

(56) References Cited

U.S. PATENT DOCUMENTS 416,190 A * 12/1889 Terry ...................... B60B 1/042 301/58
787,815 A * 4/1905 Adams ...................... B60B 1/00 301/66
(Continued)

FOREIGN PATENT DOCUMENTS

CN 101402301 A * 4/2009
CN 101402301 8/2010
(Continued)

OTHER PUBLICATIONS

International Search Report and Written Opinion for International (PCT) Patent Application No. PCT/US2022/020410, dated Aug. 15, 2022 15 pages.
(Continued)

*Primary Examiner* — S. Joseph Morano
*Assistant Examiner* — Eva L Comino
(74) *Attorney, Agent, or Firm* — Sheridan Ross P.C.

(57) ABSTRACT

A wheel for a vehicle comprises a rim to support a tire and a wheel disc connected to the rim and configured to engage an axle hub of a vehicle. The wheel disc comprises one or more spokes extending outwardly from a center section of the wheel disc to the rim, each spoke being formed by a substantially planar curbside spoke member and a substan-
(Continued)

1 - RIM BARREL TO WHEEL DISC CONNECTION-FUSION WELD, FRICTION WELD, OR ADHESIVE BOND
2 - TIRE BEAD SEAT
3 - TIRE BEAD SEAT
4 - RIM TIRE BEAD PROFILE
5 - RADIUS FILLET TOPOLOGY
6 - RIM BARREL PROFILE/HUMP
7 - INSIDE WHEEL DISC/SPOKE
8 - CURBSIDE WHEEL DISC/SPOKE TO CENTER SECTION CONNECTION - FUSION WELD, FRICTION WELD OR ADHESIVE BOND
9 - INSIDE WHEEL DISC/SPOKE TO CENTER SECTION CONNECTION - FUSION WELD, FRICTION WELD OR ADHESIVE BOND
10 - INSIDE WHEEL DISC FIXIATION RING
11 - WHEEL STUD HOLES
12 - CENTER BORE
13 - CENTER SECTION
14 - CURBSIDE WHEEL DISC/SPOKE tially planar inside spoke member, The curbside and inside spoke members are oriented transversely to each other and to a portion of the center section lying between the curbside and inside spoke members to define a triangle. A plane of the triangle is substantially parallel to a center axis of symmetry of the disc.

22 Claims, 31 Drawing Sheets

(51) Int. Cl.
*B60B 3/02* (2006.01)
*B60B 3/06* (2006.01)
*B60B 3/12* (2006.01)
*B60B 21/06* (2006.01)

(52) U.S. Cl.
CPC ................ *B60B 21/06* (2013.01); *B60B 3/06* (2013.01); *B60B 2900/111* (2013.01)

(58) Field of Classification Search
CPC ........ B60B 2310/302; B60B 2310/303; B60B 2310/305; B60B 2310/314; B60B 2310/316; B60B 2310/318; B60B 2310/323; B60B 2900/111
USPC ..... 301/63.107, 63.106, 37.29, 58, 67, 64.1, 301/64.102
See application file for complete search history.

(56) References Cited

U.S. PATENT DOCUMENTS 1,371,382 A * 3/1921 Ledwinka ................. B60B 3/18 301/64.101
1,487,754 A 3/1924 Murray
3,057,664 A * 10/1962 Lyon ......................... B60B 7/02 301/37.39
3,346,301 A 10/1967 Hurst, Jr. et al.
4,153,267 A 5/1979 Hilber
4,181,365 A * 1/1980 Kawaguchi ............... B60B 1/10 301/74
4,319,785 A 3/1982 Sato et al.
4,749,235 A 6/1988 McDougall
6,439,671 B1 8/2002 Lehnhardt et al.
7,346,984 B2 * 3/2008 Baumgartner .......... B60B 21/12 301/64.102
7,615,171 B2 11/2009 Schroeder et al.
7,891,745 B2 * 2/2011 Nagao ....................... B60B 1/14 301/58
9,561,686 B1 * 2/2017 Waldner .................. B60B 15/02
9,616,705 B2 4/2017 Burlefinger et al.
11,780,263 B2 10/2023 Rodgers et al.
2008/0303338 A1 12/2008 Takeda et al.
2010/0096908 A1 * 4/2010 Nagao ..................... B60B 21/06 301/58
2014/0139011 A1 * 5/2014 Ko ............................ B60B 5/02 29/894.342
2015/0275336 A1 10/2015 Fukuda
2017/0211708 A1 * 7/2017 Kim .................... C23C 28/3455
2017/0232498 A1 * 8/2017 Zhang .................... B21D 22/14 29/894.353
2019/0010580 A1 1/2019 Zhang et al.
2020/0180356 A1 6/2020 Van Houten et al.
2020/0406671 A1 12/2020 Denmead et al.
2022/0288968 A1 * 9/2022 Von Czarnowski ...... B60B 1/14

FOREIGN PATENT DOCUMENTS

DE 20108279 U1 * 8/2001 ............. B60B 1/041
WO WO 2020/160487 8/2020

OTHER PUBLICATIONS

International Preliminary Report on Patentability for International (PCT) Patent Application No. PCT/US2020/016236, dated Aug. 12, 2021 14 pages.
U.S. Appl. No. 17/685,595, filed Mar. 15, 2022, von Czarnowski.
"Carbon-fiber-reinforced polymers," Wikipedia, retrieved frem https://en.wikipedia.org/wiki/Carbon-fiber-reinforced_polymers, retrieved on Mar. 12, 2022, 13 pages.
"Metal foam," Wikipedia, retrieved from ttps://en.wikipedia.org/wiki/Metal_foam, retrieved on Mar. 13, 2022, 14 pages.
International Search Report and Written Opinion for International (PCT) Patent Application No. PT/US2020/16236, dated Jul. 13, 2020 24 pages.

* cited by examiner

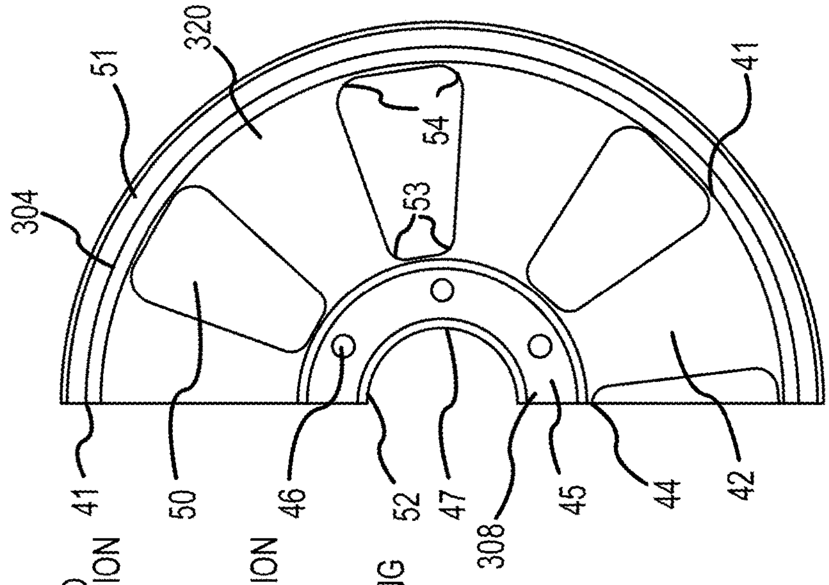

41 - RIM BARREL TO WHEEL DISC CONNECTION- FUSION WELD, FRICTION WELD OR ADHESIVE BOND

42 - INSIDE WHEEL DISC/SPOKE

43 - CURBSIDE WHEEL DISC/SPOKE TO CENTER SECTION CONNECTION - FUSION WELD, FRICTION WELD OR ADHESIVE BOND

44 - INSIDE WHEEL DISC/SPOKE TO CENTER SECTION CONNECTION - FUSION WELD, FRICTION WELD OR ADHESIVE BOND

45 - INSIDE WHEEL DISC FIXIATION RING

46 - WHEEL STUD HOLES

47 - CENTER BORE

48 - CENTER SECTION

49 - CURBSIDE WHEEL DISC/SPOKE

50 - VENTILATION HOLE

51 - RIM FLANGE

52 - CENTER BORE BEVEL

53 - RADIUS FILLET

54 - RADIUS FILLET

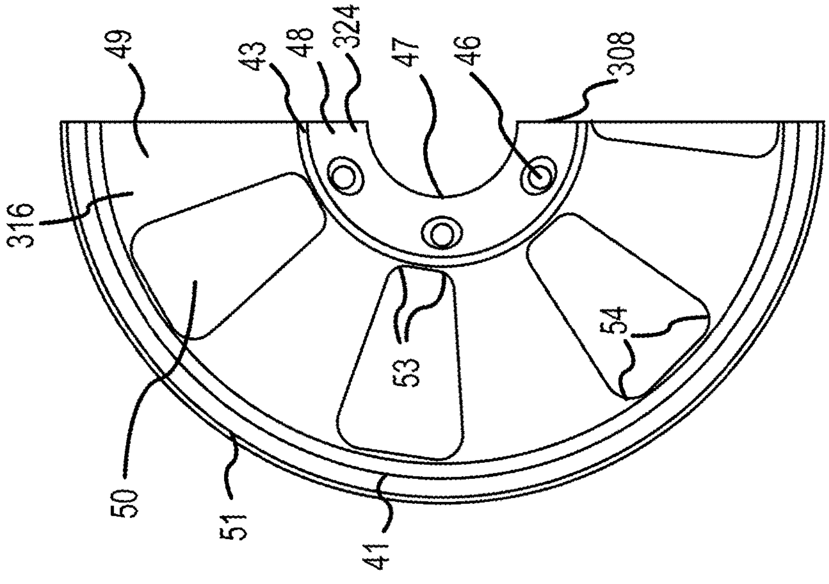

FIG.4

| Example for Joining Options | | RIM | |
|---|---|---|---|
| | | sheet | cast |
| DISC | sheet | welded, press fit, roll-bend, bolted, adhesive | press fit, adhesive |
| | extrusion | welded, press fit | welded, press fit, adhesive |
| | cast | not considered | conventional cast wheels |

*Fig. 30*

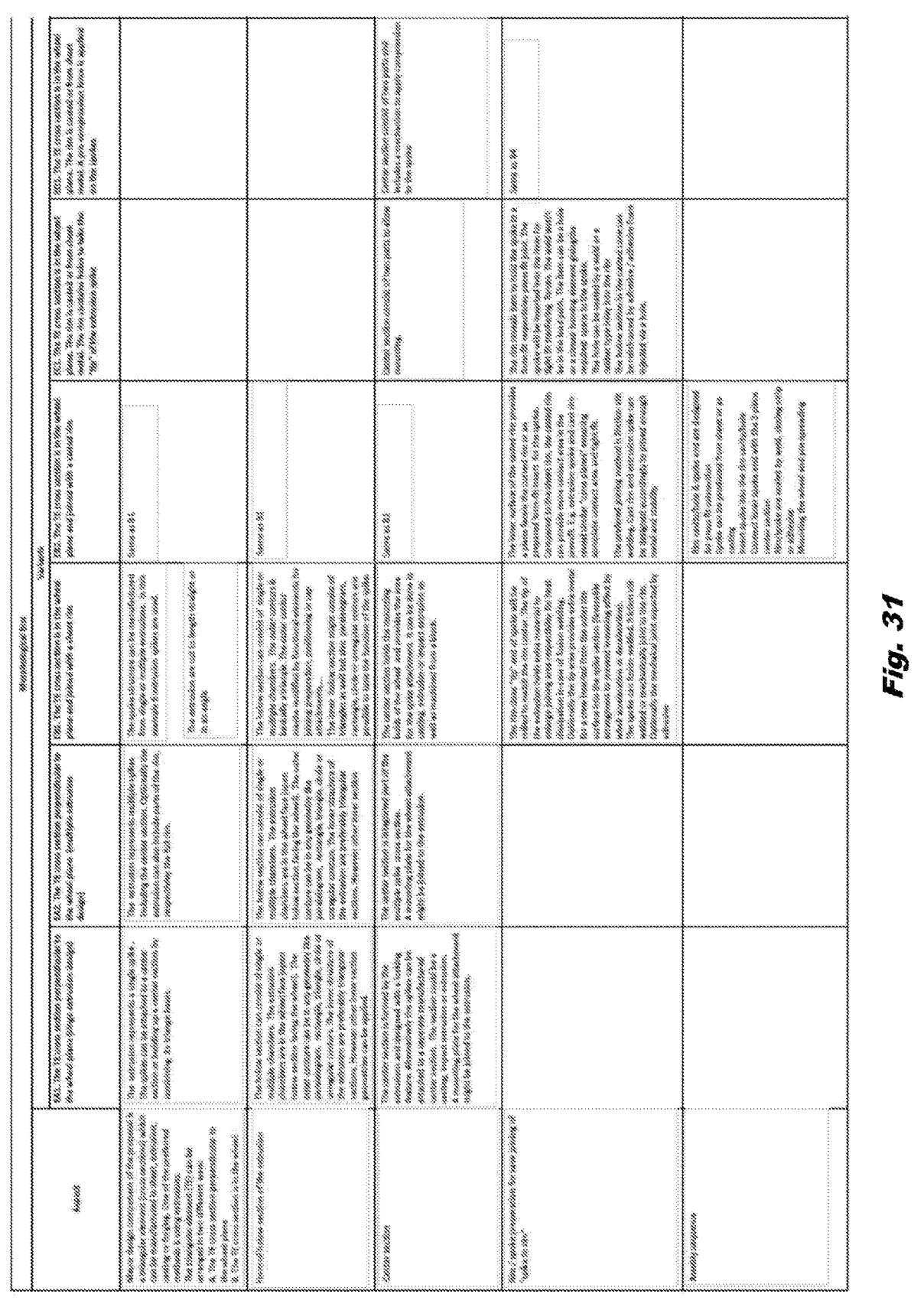

| [illegible] | | | | | | |
|---|---|---|---|---|---|---|
| [illegible] | [illegible] | | | | | |
| | [illegible] | [illegible] | [illegible] | [illegible] | [illegible] | [illegible] |
| [illegible] | [illegible] | [illegible] | [illegible] | [illegible] | | |
| [illegible] | [illegible] | [illegible] | [illegible] | [illegible] | | |
| [illegible] | [illegible] | [illegible] | [illegible] | [illegible] | [illegible] | [illegible] |
| [illegible] | | | [illegible] | [illegible] | [illegible] | [illegible] |
| [illegible] | | | | [illegible] | | |

*Fig. 31*

| Morphological box | | | | | | |
|---|---|---|---|---|---|---|
| Aspect | Variants | | | | | |
| | EA1. The TE cross section perpendicular to the wheel plane (single extrusion design) | EA2. The TE cross section perpendicular to the wheel plane (multiple extrusion design) | EB1. The TE cross section is in the wheel plane and joined with a sheet rim | EB2. The TE cross section is in the wheel plane and joined with a casted rim | EC1. The TE cross section is in the wheel plane. The rim is casted or from sheet metal. The rim contains holes to take the "tip" of the extrusion spike | ED1. The TE cross section is in the wheel plane. The rim is casted or from sheet metal. A pre-compression force is applied on the spokes. |
| 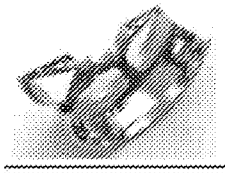 | | | 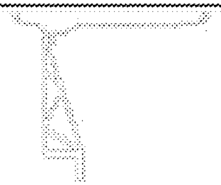 | | | |
| Form of hollow section of the extrusion | | | | | | |
| | | | | | | |
| Rim / spoke preparation for their joining of "spoke to rim" | | | 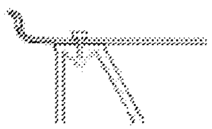 | 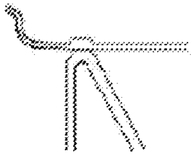 | 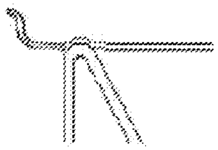 | |
| Joining "spoke to rim" | | | | | | |
| Joint preparation (peeling, cleaning,...) | | | | | | |
| Assembly sequence | | | | 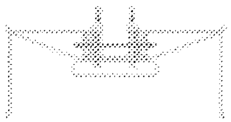 | | |

Fig. 32

DELTA WHEEL

CROSS REFERENCE TO RELATED APPLICATION

This application is a national stage application under 35 U.S.C. 371 and claims the benefit of PCT Application No PCT/US2020/016236 having an international filing date of Jan. 31, 2020, which designated the United States, which PCT application claimed the benefits of U.S. Provisional Application Ser. No. 62/860,103, filed Jun. 11, 2019, and 62/800,125, filed Feb. 1, 2019, both entitled "PATENT TRIO WHEEL", each of which is incorporated herein by this reference in its entirety.

FIELD

The disclosure relates generally to a wheel and particularly to a disc of a wheel and particularly to a wheel having one or more spokes.

BACKGROUND

There are a number of different vehicle wheel designs, with each having its advantages and disadvantages. For example, cast aluminum wheels can have a fair performance/weight ratio and good design options at a fair cost but can be sensitive to member defects. Forged aluminum wheels can have a good performance and superior design options at high cost but can be highly sensitivity to member defects. Spoked wheels can have a good performance and distinct design but can have unfavorable packaging conditions to integrate brake and suspension components. Fabricated steel wheels can have a poor performance/weight ratio and be cheap and robust but can have limited design options. Fabricated aluminum wheels can have a fair performance but can have limited design options at a medium cost and sensitive to member defects.

A state-of-the-art fabricated aluminum wheel consists of a rim and a disc made from aluminum sheet material. The presently applied sheet material is cut from flat rolled aluminum strip in a typical gauge of 8-10 mm for the disc and 4-7 mm for the rim. The 5xxx series disc material is limited to hot rolled aluminum strip, as cold rolled and annealed sheet material is offered up to about 5-6 mm only. The disc is usually formed by a drawing process, starting with the blanking of metal sheet, and then followed with reverse drawing a dome and forming the desired shape of the rim in multiple steps. Final stages are trimming, stamping/drilling of stud and ventilation holes and the center bore hole as well as coning and strengthening the wheel stud holes to limit creep of the joint. The above complex processes require severe drawing ratios, high local material ductility and high-quality edges after cutting operations. Therefore, excellent material properties are desired to enable optimum disc profile/contour. The rim of a fabricated wheel is typically roll formed from a pre-cut metal strip. Through the roll-forming process an engineered cross section is generated, with tailored local gauges (thinning) and radii for desired performance. Finally, disc and rim are fusion welded typically by MIG process making the fabricated wheel.

The key metrics for a wheel are rigidity and dynamic load distribution, which depend strongly on the contoured structural shape of the disc cross-section. It is most critical to have maximum design freedom from a material perspective as the package is restricted due to in-build brake system and suspension design. A serious disadvantage of the current fabricated wheel is that the high material gauges up to 10 mm show restricted formability, low geometrical tolerances and inconsistent material microstructures in hot-rolled-strip conditions. This is restraining the geometrical design options of the disc cross-section resulting in an unfavorable stress/strain distribution and member defect development. In turn this is limiting the weight reduction potential as well as the use of advanced material for the disc.

Hot rolled aluminum strip material has inferior material properties (e.g., strength, formability) when compared to cold rolled aluminum strip. Further tolerances regarding dimension and microstructural consistency are limited compared to cold rolled sheet material at lower gauges. The typical fabricated wheel 2-piece design based on hot rolled 5xxx sheet material does not leverage the full potential of aluminum alloys in regard to performance-to-weight ratio and consequently results in an unfavorable cost position versus aluminum cast wheels or fabricated steel wheels.

Moreover, a disc can contribute, typically predominantly, to the stiffness of the wheel and wheel rim and transfer the load forces to the hub. The disc is commonly of high gauge with a complex profile to achieve high rigidity on the expense of weight (performance). In turn, a highly curved disc design can result in a complex stress-strain distribution. Particularly in surface near volume elements, the irregular and higher stress components can be important in the presence of notches which could be caused by mechanical impact or corrosion attack. That means in present fabricated aluminum wheel concepts, the disc position and geometry make for a very low stiffness relative to disc gauge thickness. This geometry relies on higher ratios of shear forces in the wheel disc/wheel spoke in reaction to dynamic and static mechanical loads on the wheel. Shear forces generally have local shear stress maxima at the material surface which becomes critical in the presence of notches which could be caused by mechanical impact or corrosion attack.

SUMMARY

These and other needs are addressed by the various aspects, embodiments, and configurations of the present disclosure. The disclosure relates to cost efficient and ultra-lightweight wheels made from metal alloys or composite materials. The proposed product is particularly beneficial in the fleet vehicle market segment/performance wheel market segment. Advanced materials and design concepts can be applied like heat-treatable aluminum alloys, UHS or stainless steel in combination with triangulated design elements.

A wheel for a vehicle can include:

a rim to support a tire; and a wheel disc connected to the rim and configured to engage an axle hub of a vehicle.

The wheel disc can comprise one or more spokes extending outwardly from a center section of the wheel disc to the rim, each spoke being formed by a curbside spoke member having a substantially planar curbside spoke surface and an inside spoke member having a substantially planar inside spoke surface. Outer ends of the curbside and inside spoke members can engage the rim and inner ends of the curbside and inside spoke members can engage the center section of the wheel disc. The substantially planar curbside and inside spoke members can be oriented transversely to each other and to a surface portion of the center section lying between the substantially planar curbside and inside spoke members to define a triangle. A plane of the triangle can be substantially parallel to a center axis of the disc.

A wheel for a vehicle can include:

a rim to support a tire, a curbside edge of the rim defining a rim plane; and a wheel disc connected to the rim and configured to engage an axle hub of a vehicle, wherein the wheel disc comprises one or more spokes extending outwardly from a center section of the wheel disc to the rim, each of the one or more spokes being formed by a curbside spoke member and an inside spoke member. Outer ends of the curbside and inside spoke members can engage the rim and inner ends of the curbside and inside spoke members can engage the center section of the wheel disc. A substantially planar curbside spoke surface of the curbside spoke member can be positioned such that the substantially planar curbside spoke surface of the member lies substantially in the rim plane and a substantially planar inside spoke surface of the inside spoke member can be positioned such that it is transverse to the rim plane.

A method can include the steps of:

forming a first substantially flat circular sheet from a flat rolled metal sheet;

forming a second substantially flat circular sheet from the flat rolled metal sheet;

forming the at least a portion of the second circular sheet into a conical shape by deep drawing; and joining the first substantially flat circular sheet and the second conically shaped circular sheet to form a wheel having an outer rim.

The outer rim and first and second sheets can be discrete from one another, the outer rim and first and second sheets can be discrete from a center section, and the joining step can include:

locating ends of the flat circular and second conically shaped circular sheets in contact with the rim while opposing ends of the circular sheets are in contact with the center section;

compressing the ends of the flat circular and second conically shaped circular sheets while in contact with the rim; and while under compression, welding the ends and the rim together.

The second circular sheet can include, or be integral with, the rim.

The outer rim and first and second sheets can be discrete from one another, the outer rim and first and second sheets can be discrete from a center section, and the joining step can include:

contacting ends of the flat circular and second conically shaped circular sheets with the rim while opposing ends of the circular sheets are in contact with the center section;

stabilizing the ends of the flat circular and second conically shaped circular sheets while in contact with the rim and center section; and while stabilized, stir welding the ends and the rim together.

The outer rim and first and second sheets can be discrete from one another, the outer rim and first and second sheets can be discrete from a center section, and the joining step can include:

contacting ends of the flat circular and second conically shaped circular sheets with one another while opposing ends of the circular sheets are in contact with the center section;

contacting an end of the second conically shaped circular sheet, but not an end of the first flat circular sheet, with the rim while opposing ends of the circular sheets are in contact with the center section; and welding the ends of the flat circular and second conically shaped circular sheets with each other and the end of the second conically shaped circular sheet with the rim while in contact with the rim and center section.

The triangle can be a right triangle, wherein the curbside spoke surface is perpendicular to the portion of the center section, and wherein a length of the curbside spoke member is less than a length of the inside spoke surface and the lengths of the inside and curbside spoke surfaces are longer than a length of the portion of the center section.

The triangle can be a right triangle, wherein the inside spoke surface is perpendicular to the portion of the center section and wherein the length of the inside spoke member can be determined from the lengths of the curbside spoke member and portion of the center section using the Pythagorean theorem.

The triangle can be an Isosceles right triangle, wherein the inside spoke member is the same length as the curbside spoke member and wherein the length of each of the inside and curbside spoke members is longer than a length of the portion of the center section.

The triangle can be an acute triangle, wherein the inside spoke member, the curbside spoke member, and the portion of the center section have different lengths.

The center axis of the wheel can be an axis of symmetry of the disc.

The center axis of the wheel can be substantially parallel to an interconnected axle of the vehicle. As will be appreciated, the axle is interconnected to the wheel by being removably engaged with the axle hub.

The wheel can be a fabricated wheel with substantially minimized bending forces in the inside and curbside spoke members, thereby preventing high tension stress in surface near zone of the spoke, and wherein each of the inside and curbside spoke members are fabricated from sheet or extrusion products made from metal or non-metal material.

Each of the inside and curbside spoke members can be flat rolled products comprised of high strength steel or aluminum wrought material.

The extrusion products can be a high strength aluminum wrought material and wherein the wheel comprises a non-metal material comprised of reinforced plastic based on fibers or flakes made of carbon, graphite or graphene or graphene oxides constituents.

The triangular shape can avoid high bending forces in a member near zone.

A normal vector of the triangle can be dominantly in a wheel rotational trajectory to resist the side forces.

The triangle can have a plane vector perpendicular to a rotational trajectory of the wheel to resist forces while accelerating or de-accelerating the vehicle.

Each of the inside and curbside spoke members can be comprised of flat rolled products in steel or aluminum, which are cut and eventually 3-dimensional deformed.

Each of the inside and curbside spoke members can be comprised of extruded products in aluminum, which are cut and 3-dimensional deformed.

Each of the inside and curbside spoke members can be comprised of fabricated profiles from steel or reinforced plastic, which are cut and eventually 3-dimensional deformed.

For each of the inside and curbside spoke members, a variance of stress distribution across a thickness of the inside or curbside spoke members is less than about 50 percent (center to surface variance), while a thickness of the inside or curbside spoke member cross sections (outside the center section) does not exceed about 5 mm at a thickest cross section with reference to aluminum sheet alloy based on a wheel load of 800 Kg. The typical flow stress of an 6xxx aluminum alloy for wheel disc ranges from 260-300 MPa. Alloys with higher flow stress would have a lower maximum cross section gauge of the disc sheets. The bending moment can result in a neutral stress layer in the material, therefore has 100 R % variance as above.

Each of the inside and curbside spoke members can be made of sheet material and fabricated from cut and preformed sheets, wherein the inside and curbside spoke members, center section, and rim are welded or mechanically fastened or connected by adhesive or held in position by fit formed geometry or by a combination of those.

The wheel can be fabricated by friction stir welding, wherein a material reservoir is created close to an outer perimeter of the disc to be pushed against an inner rim member.

The inside and curbside spoke members can be made of sheet material and center section are made of extrusions, in which the disc consists of multiple cut and preformed extrusions, wherein the multiple cut and preformed extrusions are welded or mechanically fastened or connected by adhesive or held in position by fit formed geometry or by a combination of those.

The disc and rim can be made of two sheets, a first sheet forming partially the rim and disc at a side of the suspension and a second sheet forming an outer side of the rim and disc.

The inside spoke member can be formed by the first sheet and the curbside spoke member is formed by the second sheet.

The first sheet can be fabricated by deep drawing and an (eventual) final calibration by radial forming operation like spin-forming.

The second sheet can be manufactured by deep-drawing and an (eventual) calibration by radial forming operation like spin-forming.

The partially formed rim and disc at a side of the suspension and the outer side of the rim and disc can be connected by welding or mechanically fastened or connected by adhesive by a combination of those.

A final calibration process can be applied after assembly of the partially formed rim and disc at a side of the suspension and the outer side of the rim and disc, wherein the calibration is performed by a radial forming operation like spin-forming.

One or more of the curbside spoke member, inside spoke member and center section can be formed by deep drawing and optionally warm formed at temperatures as follows 7xxx at least at 150° C., 6xxx at least at 150° C. in T6 and 5xxx at least at 150° C.

One or more of the curbside spoke member, inside spoke member and center section can be formed by deep drawing and is optionally cryogenic formed at temperatures as low as −150° C. or below.

An outer sheet-component of the wheel can be used as a design element revealing a full-face layout (avoiding the S-curved shape of a conventional fabricated sheet wheel), wherein the inside and curbside spoke members is formed from a flat sheet, and wherein the flat sheet is one or more of painted, laminated, polished, and a combination thereof.

The outer sheet-component of the wheel can be used for ventilation to dissipate heat from the inner to the outer sector of the wheel, wherein the spoke members comprise one or more cut-outs utilized forming an open full-face design, and wherein the cut-outs are optionally formed in a manner to enhance turbulent flow in the inner section of the wheel.

The spoke members can be substantially optimized for minimum drag resistance, wherein the spoke members comprise substantially minimum cut-outs, and wherein a set back of the outer disc to a rim edge is minimized.

The triangular spoke can allow the use of apply high strength materials by micro-alloying as the vertical stress component in the member is minimal, and consequently a crack propagation less critical compared to conventional fabricated wheels.

A ventil can be installed in the conventional way at the center section or at the outer perimeter of the disc and is connected by a tube with the rim.

The outer disc can comprise ballistic armor plate made from monolithic metal or composite material or multilayers. Optionally the perimeter of the outer disc can exceed the rim diameter in order to protect the tires of the wheel.

At least most of area of the substantially planar curbside spoke surface can lie in the rim plane.

Triangular or angular elements form the disc/spokes within the wheel (or wheel rim). One or more triangular or angular elements build up the cross section of single disc components like spokes or hub. The elements can be manufactured starting with a flat rolled metal sheet, aluminum extrusion, casting, forging or composites. Various designs can arrange the trio elements in different ways. The different designs can be manufactured from unlike materials and various joining methods.

Triangulated elements for the spokes can be specifically made from flat-rolled Al-sheet. In the elementary version, two sheet shaped spokes form two sides of the triangular element whereas the hub forms the base. However, the two sheet-spokes can be made up form more than one triangulated element. Also, other wheel elements like the hub can be formed by triangulated elements.

The wheel disc can comprise one or more cross members positioned between the curbside and inside spoke members to define a truss-like load support network.

The wheel-load can be transferred from the outer rim to the inner supporting structure by a press-fit.

The inner structure can consist of spokes members in a triangular design, wherein this arrangement avoids that welded or mechanical joints are compromised by load peaks.

The rim component can consist of a conventional spin-formed sheet or a casting disc.

The spokes can comprise the triangular members, wherein the load bearing press-fit is be secured respectively locked up by conventional joining methods like fusion welds, adhesives, mechanical joins, bolds or sealing tapes whereas those locking joints are not limiting the wheel load.

The rim/spoke interface can reveal geometrical characteristics creating a form-fitting interleaving feature to accommodate the stresses in the press-fit, e.g., geometrical features might be cast cavities in case of cast rims, drawn elements in case of sheet rims, cut-outs in case of sheet rims or a reinforced (thickened) flat interface press fit.

The spokes can be pushed by means of expansion mechanism into a form-fit characteristic of the rim, wherein the expansion mechanism is integrated in the center section, and wherein the center-section expansion mechanism uses inclined planes to transfer axial into radial movements, and wherein the radial movement pushes the spoke into the form-fit feature.

The present disclosure can provide a number of advantages depending on the particular configuration. The novel triangulated aluminum sheet wheel geometry can allow reduced gauge thicknesses (typically about 2-5 mm). The lower gauge can enable the use of superior 5xxx alloys made from cold rolled aluminum strip as well as heat-treatable alloy-sheet or other advanced material concepts. The synergistic combination of lower sheet gauge and advanced material can allow for additional material savings for light-weighting and resultant cost and performance optimization.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 4 depicts front (left) and rear (right) views of a delta wheel according to embodiments of the present disclosure;

FIG. 30 is a table depicting various joining options for the curbside and inside spoke members and/or rim according to an embodiment of the present disclosure;

FIG. 31 is a morphological box depicting various manufacturing options for extruded spoke members according to embodiments of the present disclosure;

FIG. 32 is a continuation of the morphological box of FIG. 31;

DETAILED DESCRIPTION

Stress and Strain Distribution

Figure 1A:
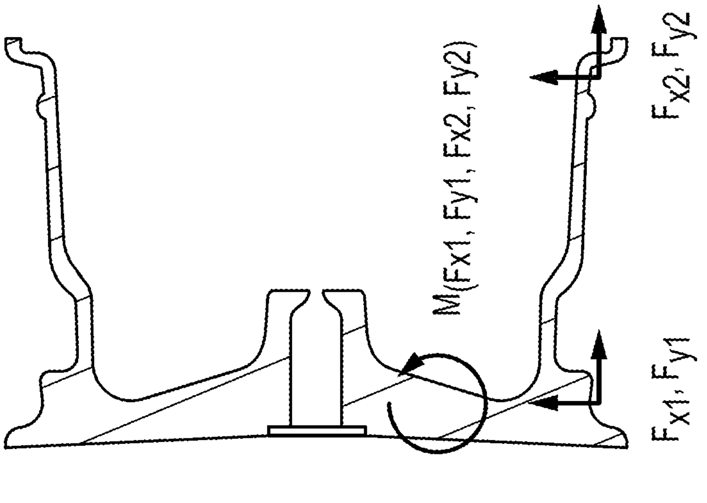
FIGS. 1A and 1C show force trajectories in a conventional wheel.

In a wheel, the disc contributes predominantly to the stiffness of the wheel and transfers the load forces from the outer wheel to the hub components. Therefore, in the currently used fabricated wheels the disc is of high gauge with a complex profile to achieve high rigidity on the expense of weight (performance). In turn, the highly curved disc design results in complex stress-strain distribution. Particularly in surface near volume elements, the irregular and higher stress components can be critical in the presence of notches, which could be caused by mechanical impact or corrosion attack. That means in present fabricated aluminum wheel concepts, the disc position and geometry account for a very low stiffness relative to disc gauge thickness. This geometry relies on higher ratios of shear forces in the wheel disc/wheel spoke in reaction to dynamic and static mechanical loads on the wheel. Shear forces generally have local shear stress maxima at the material surface, which becomes critical in the presence of notches which could be caused by mechanical impact or corrosion attack.

In the wheel of the present disclosure by contrast, triangular elements form the disc/spokes within the wheel. One or more triangular or "trio" elements build up the cross section of single disc components like spokes or hub. The elements can be manufactured starting with a flat rolled metal sheet, aluminum extrusion, casting, forging or composites. In the following sections, various versions to arrange the trio elements are described. This different version can be manufactured from unlike or different materials and various joining methods.

An elementary version of this concept uses triangulated elements for the spokes, which are specifically made from flat-rolled Al-sheet. In the elementary version, two sheet shaped spokes form two sides of the triangular element whereas the hub forms the base. However, the two sheet-spokes can be made up from more than one triangulated element. Also, other wheel elements like the hub can be formed by triangulated elements. The principle advantages of the disclosure will first be described for the above elementary version.

The novel triangulated aluminum sheet wheel geometry can allow reduced gauge thicknesses (typically about 2-5 mm). The lower gauge enables the use of superior 5xxx alloys made from cold rolled aluminum strip as well as heat-treatable alloy-sheet or other advanced material concepts. The synergistic combination of lower sheet gauge and advanced material can allow for additional material savings for light-weighting and resultant cost and performance optimization A triangulated geometry creates a stress-strain distribution along the principal material axis and in-plane with the wheel disc/wheel spoke/aluminum sheet material. Aluminum alloy has much better tensile then shear strength, therefore designing a wheel disc structure to carry the dynamic/mechanical wheel loads through tensile forces can permit a much lighter wheel design.

Figure 1B:
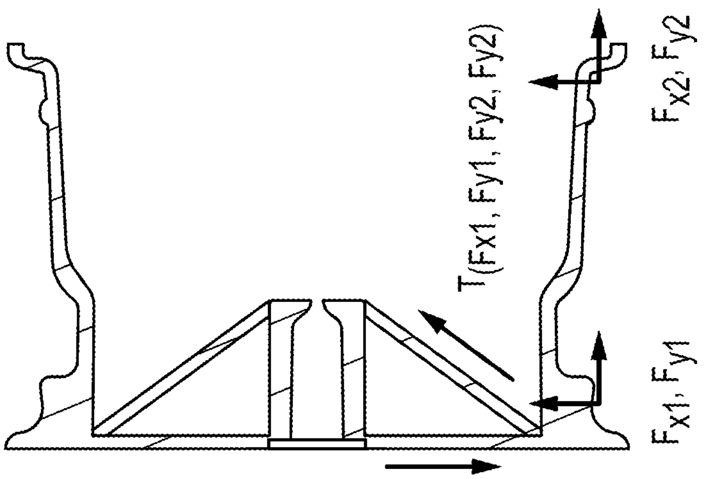
FIGS. 1B and 1D show force trajectories in a delta wheel according to embodiments of the present disclosure.
Figure 1C:
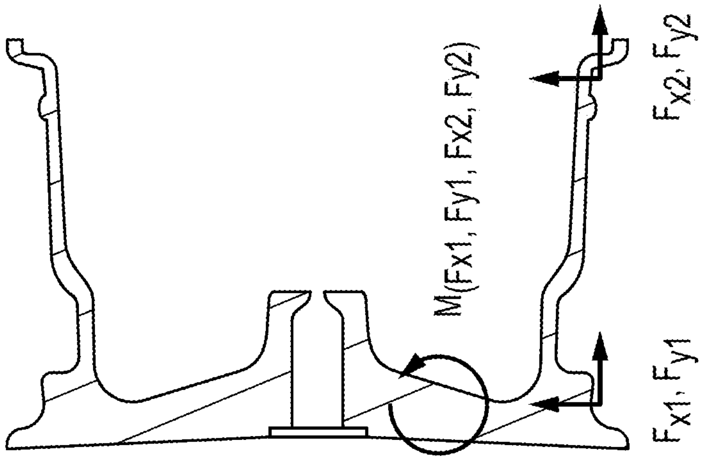
Figure 1D:
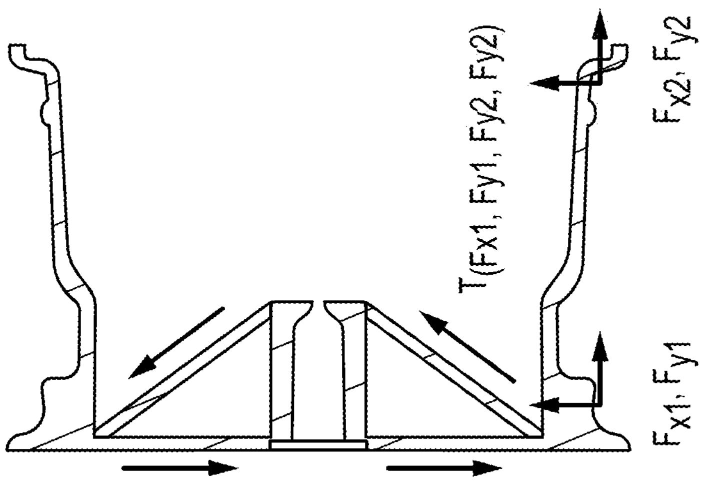

FIGS. 1A and C show force trajectories in a conventional wheel and FIGS. 1B and D show force trajectories in a wheel in accordance with the present disclosure. Conventional wheel designs (fabricated alloy aluminum, fabricated steel, cast alloy, and the like) rely on higher rations of shear forces in the wheel disc/wheel spoke (in reaction to dynamic and static mechanical loads on the wheel) when compared to the wheel of the present disclosure.

Figure 2B:
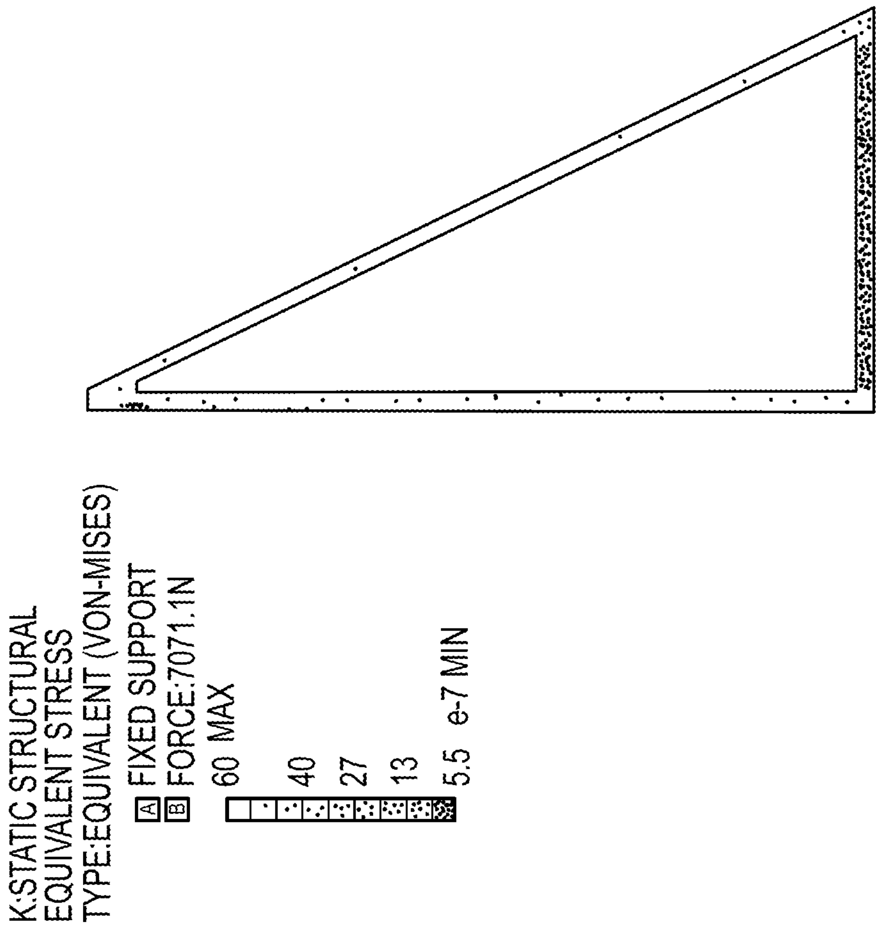
FIG. 2B shows a stress distribution of a triangular design element according to embodiments of the present disclosure.
Figure 2A:
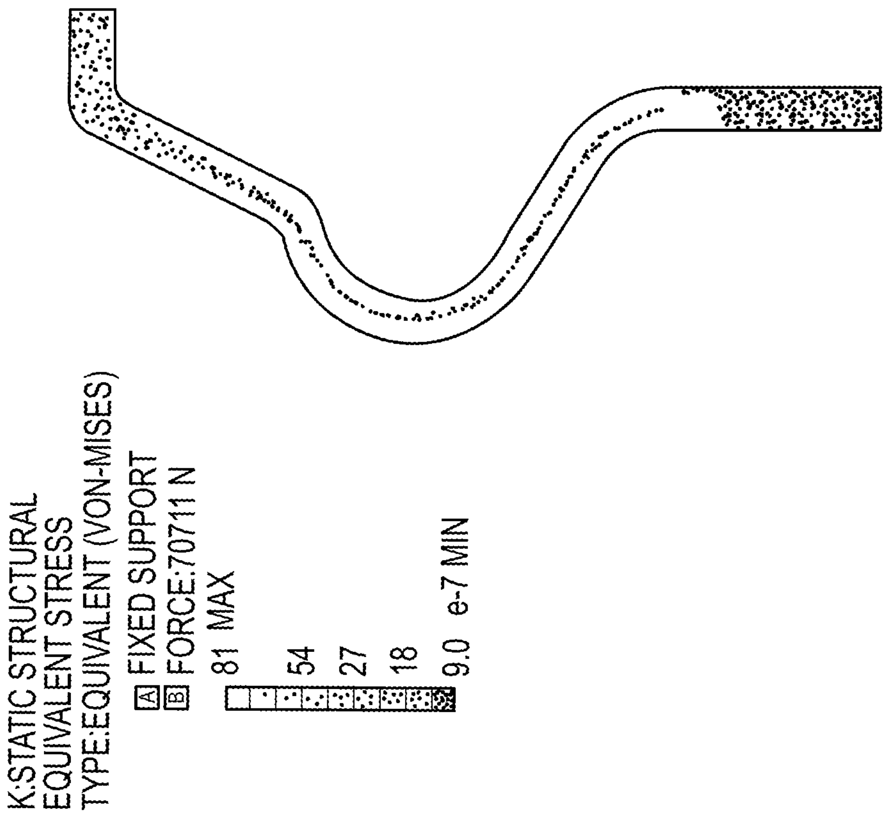
FIG. 2A shows a stress distribution of a conventional disc geometry.

FIGS. 2A and B compare the stress distribution of the conventional disc geometry (FIG. 2A) against a triangular design element (FIG. 2B). In conventional fabricated aluminum wheel concepts, the disc position and geometry make for a very low stiffness relative to disc gauge thickness, therefore the disc material options are restricted to high gauge (about 8-10 mm) hot rolled sheet material. This geometry relies on higher ratios of shear forces in the wheel disc/wheel spoke in reaction to dynamic and static mechanical loads on the wheel. As noted above, shear forces generally have local shear stress maxima at the material surface which becomes critical in the presence of notches which could be caused by mechanical impact or corrosion attack.

A triangulated wheel disc geometry can minimize surface stress concentrations and in effect increases fatigue life and longevity.

Additionally, the triangulated geometry can allow the use of thinner gauge (typically about 3-5 mm gauge thickness versus about 8-10 mm, conventional fabricated aluminum alloy wheel) cold rolled aluminum sheet material. Thicker gauge aluminum sheet can only be hot rolled and have less favorable material properties with respect to wheel design. The geometry therefore can allow the use of mechanically superior materials as opposed to conventional/state-of-the-art wheel designs.

The state-of-the-art fabricated aluminum wheel is supported by a single deep drawn disc made of metal sheet. In the elementary version of the wheel of the present disclosure, the single disc is replaced by multiple sheets forming one or more triangle sections. A triangulated element will always be in a plane forming a stable structure. Bending modes are suppressed so that the dominate stress mode is tension and compression. The triangulated design delivers several "cascading" advantages. The advantages are described for fabricated aluminum wheels, as an example, but not limited to FRP aluminum. While the discussion is with reference to specific aluminum alloys, the concepts of the present disclosure apply to other aluminum alloy compositions, other light-weight metal alloys of metals other than aluminum, heavier weight metal alloys such as steel, and composites thereof.

The potential weight reductions of a wheel according to the present disclosure are manifold: By way of example:

(1) The triangulated design can enable the use of superior cold rolled material properties and tolerances allowing weight reduction in the disc.

(2) The current state-of the-art fabricated Al-wheel is manufactured from 5xxx series aluminum alloys. The one-disc design is typically $t_d \approx 8$-10 mm gauge. Using the proposed multiple Al-sheets design, preferably a 2-disc version, lighter gauges $t_d < 4$ mm can be used for the 2-piece disc. In consequence higher quality 5-series cold rolled Al-strip can be applied instead of hot-rolled 5-series sheet. Cold rolled sheet material can provide better strength forming operation, surface quality, as well as better dimensional tolerances and material property tolerances.

(3) The rigidity of triangle elements compared to classical disc-rim design can enable further gauge reduction of the disc. The high stiffness of the two-disc forming a trussed or triangulated-element can allow a further weight reduction.

(4) In the current state-of-the-art wheel design non-heat-treatable 5-series aluminum are applied since "high strength" heat-treatable alloys can't fully leverage their high fatigue potential under corrosion attack, such as introduced by a notched surface. In combination with the complex stress distribution in the conventional disc geometry, the factual fatigue performance does not benefit significantly from using high strength Al-alloys. In contrast, the prevailing tension/compression mode in the proposed triangle or trio geometry can be less critical in respect to the interaction of high strength material with corrosion introduced surface notches.

The triangulated geometry can leverage time/cost efficient computer-aided topology optimization (TO) of the in-plane wheel disc contour. A high structural optimization level is produced since the double plane design/triangulated design commonly only requires further 2-dimensional in-plane disc contour optimization. Additional advantages included the associated low-cost re-designability of the disc contour for different load conditions/vehicles. Disc re-design only requires a change in cutting toolpath or stamping die.

Table 1 below summarizes the relative advantages and disadvantages of conventional wheel designs compared with the delta wheel design of the present disclosure:

TABLE 1

| Wheel Concept | Cost | Weight | Optical Design Capability | Inherent Corrosion Resistance | Overload Tolerance | Management Summary+/− |
|---|---|---|---|---|---|---|
| Fabricated Steel Sheet | ++ | − | −− | −− | + | −− |
| Fabricated Aluminum Sheet | + | + | −− | ○ | + | + |
| Casted Aluminum | ○ | ○ | ○ | ○ | ○ | ○ |
| Forged Aluminum | − | + | + | ○ | + | ++ |
| Forged Magnesium | −− | ++ | ○ | −− | ○ | −− |
| Delta Wheel Aluminum | + | ++ | ○ | ○ | + | ++++ |

Casted Aluminum Wheel Taken as Reference With All Properties Set to "O" by Definition As shown in Table 1, the high-performance forged wheels are very expensive while casted design wheels are cheap but heavy. None of these wheel designs combines low cost for the mass market and high performance. The more cost-efficient fabricated aluminum wheels suffer from poor cosmetic/visual appeal and have inherently compromised material selection and structural design.

Wheel Design Options

Table 2 below illustrates different design categories for a triangulated wheel design. The manufacturing and joining methods indicated in table 2 are favorable, but manufacturing joining is not limited to those choices. Alternative semis might be castings, forgings, impact extrusions, composites, 3D printed parts, or other options. The base version of the design is commonly in Aluminum AA6061 grade, however other aluminum series as 3xxx/5xxx/6xxx or 7xxx are applicable. The concept is not limited to aluminum alloys. For example, steel-grades are considered in the proposal as well as composite structures.

With reference to FIGS. 3-4 and 12-17, the wheel 300 comprises a rim barrel 304 and wheel disc 308. The wheel disc 308 comprises a center bore 12 and 47, center section 13 and 48, wheel stud holes 11 and 46 in an inside wheel disc fixation ring 10 and 45, and a plurality of spokes 312. Each of the spokes 312 has a triangular cross-section 332 formed by a curbside spoke member 316 having a curbside spoke surface 318, an inside spoke member 320 having an inside spoke surface 322, and a center section member 324 having a center section surface 326. The triangular cross-section is taken along a plane parallel to a central axis 328 of the wheel. In each spoke, the curbside spoke member 316 of the curbside wheel disc/spoke 14 and 49 and center section 324 can be connected 8 and 43 by any suitable technique, such as a fusion weld, friction weld, or adhesive bond. Likewise, in each spoke the inside spoke member 320 of the inside wheel disc/spoke 7 and 42 and center section 324 can be connected 9 and 44 by any suitable technique, such as a fusion weld, friction weld, or adhesive bond. As shown, the curbside and inside spoke surfaces 318 and 322 in each spoke are substantially planar and from an acute angle with one another. The center section 324 forms a substantially cylindrical surface having a substantially constant radius and

TABLE 2

| | Basic Design Categories | | | | |
|---|---|---|---|---|---|
| Rank | 1 | 2 | 3 | 4 | 5 |
| Top Vertex Geometry | 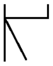<br>A | 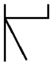<br>B | 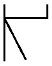<br>C | 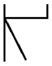<br>D | 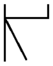<br>E |
| Rim Type | 1- Spin formed sheet<br>2- Flow formed cast<br>3- conventioanl cast | 1- (Rim&Soke Combo.)<br>- deep drawen and spin formed | 1- Spin formed sheet<br>2- Flow formed cast<br>3- conventioanl cast | 1- (Rim&Soke Combo.)<br>- deep drawen and spin formed | 1- Spin formed sheet<br>2- Flow formed cast<br>3- conventioanl cast |
| Top Fastening Mechanism | 1- MIG weld<br>2- Bolted<br>3- Friction weld<br>4- Adhesives | 1- Geometrically confined + adhesives<br>2- Geometrically confined + Spot Weld | 1- MIG weld<br>2- Friction weld | 1- MIG weld<br>2- Bolted<br>3- Friction weld<br>4- Adhesives | 1- MIG weld<br>2- Friction weld |
| Center Section | 1- MIG welded extrusion<br>2- One-piece cast<br>3- Sheet construction<br>4- Impact extrusion | 1- MIG welded extrusion<br>2- One-piece cast<br>3- Sheet construction<br>4- Impact extrusion | 1- MIG welded extrusion<br>2- One-piece cast<br>3- Sheet construction<br>4- Impact extrusion | 1- MIG welded extrusion<br>2- One-piece cast<br>3- Sheet construction<br>4- Impact extrusion | 1- MIG welded extrusion<br>2- One-piece cast<br>3- Sheet construction<br>4- Impact extrusion |
| Front Disc-Center Fastening | 1- MIG weld<br>2- Bolted<br>3- Adhesives | 1- MIG weld<br>2- Bolted<br>3- Adhesives | 1- Slide-lock in groove<br>2- MIG weld<br>3- Bolted<br>4- Adhesives | 1- MIG weld<br>2- Bolted<br>3- Adhesives | 1- MIG weld<br>2- Adhesives<br>3- Friction weld |
| Rear Disc-Center Fastening | 1- Clamp + MIG<br>2- Clamp + Adhesives | 1- Camp + MIG<br>2- Clamp + Adhesives | 1- Clamp + MIG<br>2- Clamp + Adhesives | 1- Clamp + MIG<br>2- Clamp + Adhesives | 1- Clamp + MIG<br>2- Clamp + Adhesives<br>3- Friction weld |

Figure 3:
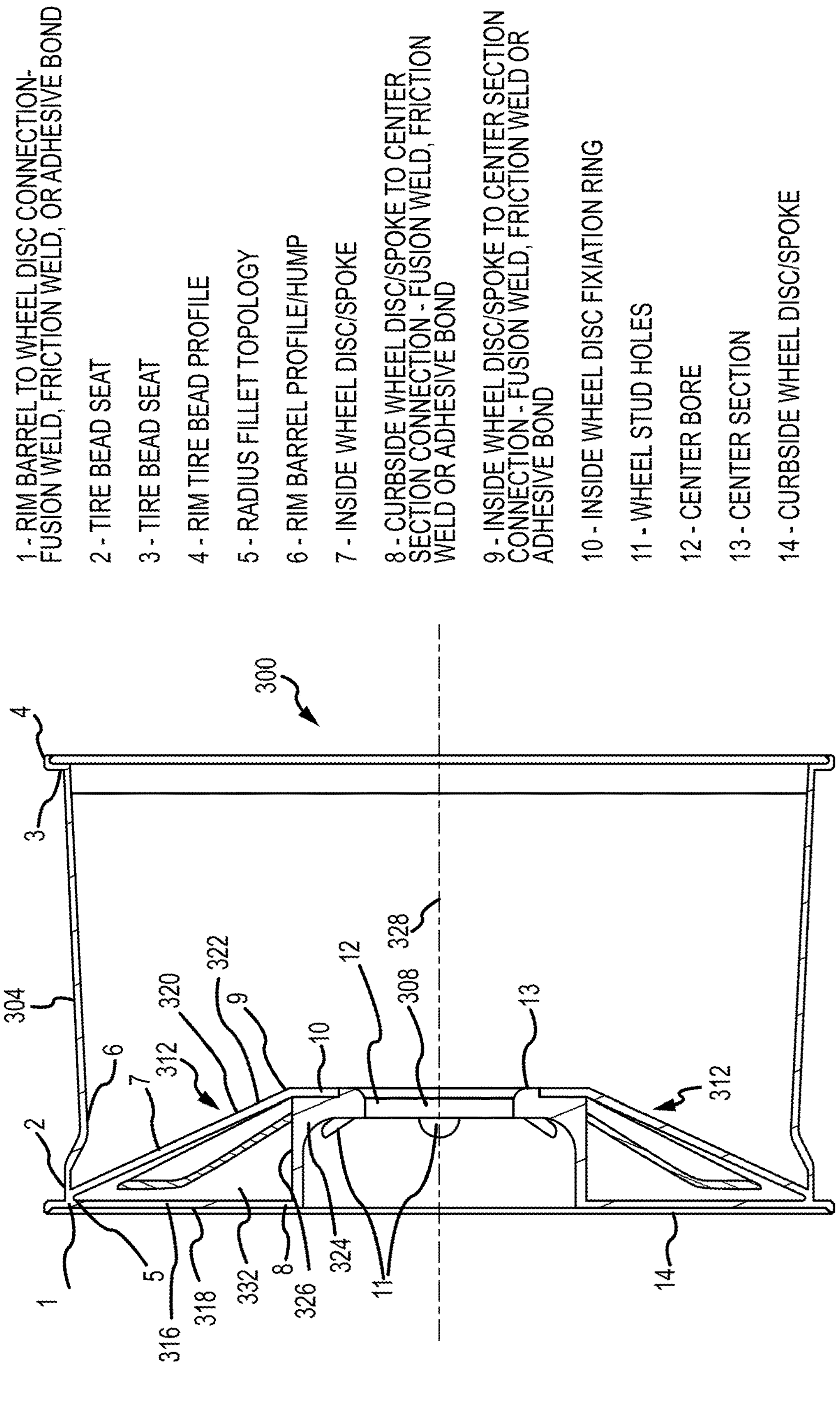
FIG. 3 depicts a cross section of a delta wheel according to embodiments of the present disclosure.

FIGS. 3-4 depict a wheel in accordance with embodiments of the present disclosure. Before discussing the wheel design, it is important to first understand wheel terminology. A wheel typically refers to the entire assembly on which the tire is mounted and includes an outer rim and an inner wheel disc. The hub is the wheel base or axle hub and has studs on which the wheel is attached to the vehicle suspension. The rim is a cylindrical wheel outer edge holding the tire on the wheel. The main function of the rim is to support and seal the tire to the wheel. In particular, the rim ensures proper fitting between the tire and rim to retain air inside the tire. The disc is a part of the wheel which connects to the rim and axle hub. The rim and disc may be permanently joined together or detachable depending on the application.

diameter around its periphery and along its height measured from the center axis 328. In other words, the center section 324 has a circular cross section and not an ellipse, parabola, or hyperbola cross-section (e.g., is a right circular cylinder and not an elliptic cylinder, parabolic cylinder, or hyperbolic cylinder). Each of the curbside and inside spoke members 316 and 320 from an angle with the center section 324 that is no more than 90 degrees.

As will be appreciated, many other wheel configurations are possible using the concepts of the present disclosure. For example in some spoke embodiments, the curbside spoke member 316 or surface 318 forms a normal angle with the center section 324 or center section surface 326 while the inside spoke member 320 or surface 322 forms an acute angle with the center section member 324 or center section surface 326. In some spoke embodiments, the curbside spoke member 316 or surface 318 forms an acute angle with the center section 324 or center section surface 326 while the inside spoke member 320 or surface 322 forms a normal angle with the center section 324 or center section surface 326. In some spoke embodiments, the vertices of the triangle formed by the curbside spoke member 316 or surface 318, inside spoke member 320 or surface 322, and center section 324 or center section surface 326 form an equilateral triangle. In some spoke embodiments, the curbside spoke member 316 or surface 318 and inside spoke member 320 or surface 322 are the same length and form an isosceles triangle. In some spoke embodiments, the curbside spoke member 316 or surface 318, inside spoke member 320 or surface 322, and portion of the center section 324 or center section surface 326 forming the base of the triangle are different lengths. In some spoke embodiments, the vertices of the triangle formed by the curbside spoke member 316 or surface 318, inside spoke member 320 or surface 322, and center section 324 or center section surface 326 form a right triangle. In some spoke embodiments, the vertices of the triangle formed by the curbside spoke member 316 or surface 318, inside spoke member 320 or surface 322, and center section 324 or center section surface 326 form an acute triangle. In some spoke embodiments, the curbside spoke member 316 or surface 318 and inside spoke member 320 or surface 322 are longer than the length of the center section 324 or center section surface 326 forming the base of the triangle. In some embodiments the curbside spoke members or surfaces of the plurality of spokes are substantially coplanar with each other and lie in a parallel plane formed by the curbside opening or outer edge of the rim barrel 304. In some embodiments the inside spoke members or surfaces of the plurality of spokes are substantially coplanar with each other and lie in a parallel plane formed by the inside (or hub-side) opening or inner edge 1400 of the rim barrel 304. In some embodiments the curbside spoke members or surfaces of the plurality of spokes are substantially coplanar with each other and located between (and parallel with) a curbside plane formed by the curbside opening or outer edge 1404 of the rim barrel 304 and the inside (or hub-side) opening 1400 or inner edge of the rim barrel 304.

The rim barrel 304 includes outer and inner tire bead seats 2 and 3, has a rim tire bead profile 4 in the form of a hump, and has a radius filled topology 5. The rim barrel 304 is connected 1 and 41 to the wheel disc by any suitable technique, such as a fusion weld, friction weld, or adhesive bond.

With reference to FIG. 4, the curbside spoke member 316 and inside spoke member 320 each include a ventilation hole 50 having a radius fillet 53 and a radius fillet 54. The rim barrel 304 includes a rim flange 51, and the wheel disc 308 includes a center bore bevel 52.

With reference to FIGS. 14-17, it can be seen that an interior 1600 of the spoke is open to the atmosphere on either side of the spoke to enable air to flow through the spoke during wheel rotation, thereby reducing drag and increasing fuel efficiency. Stated differently, either side of the spoke is not enclosed by a side member as is the case in many conventional spoke designs.

In some embodiments, each of the spoke members and portion of the center section lying between them have a maximum thickness typically of no more than about 7.5 mm and more typically of no more than about 5 mm and a minimum thickness typically of at least about 1.5 mm and more typically of at least about 2 mm.

Other wheel embodiments are possible.

Figure 19:
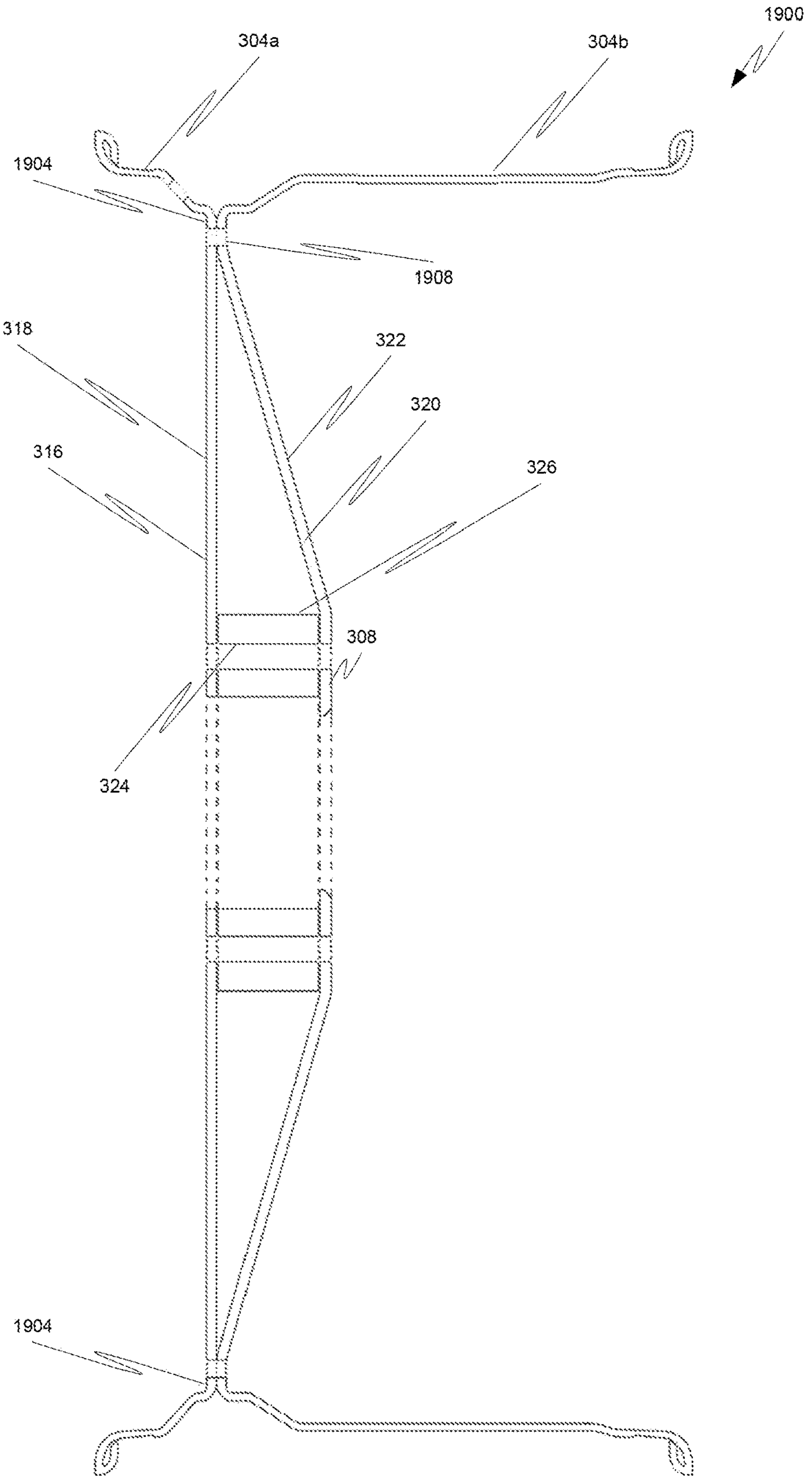
FIG. 19 is a cross-sectional view of a wheel according to an embodiment of the present disclosure.
Figure 21:
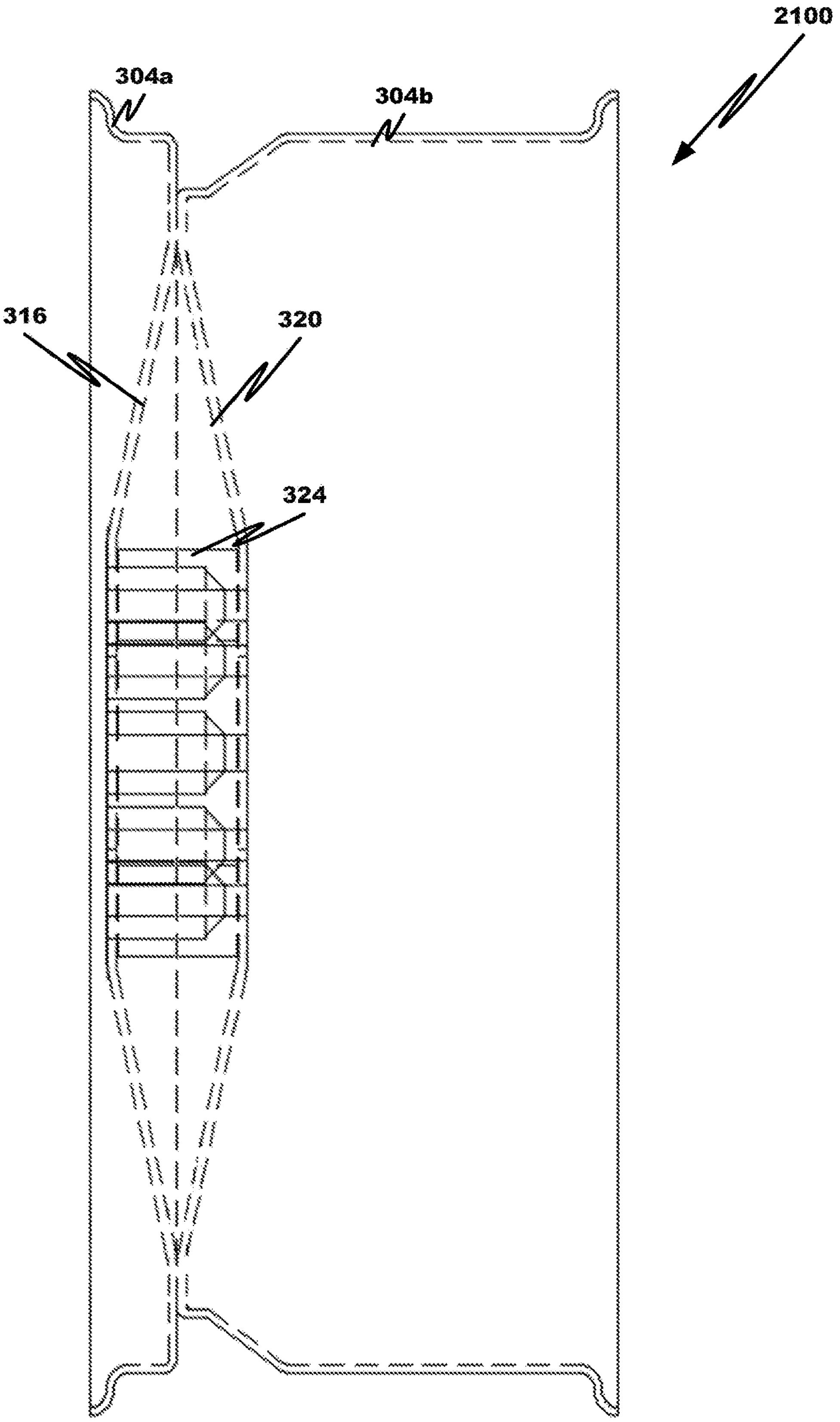
FIG. 21 is a cross-sectional view of a wheel according to an embodiment of the present disclosure.
Figure 22:
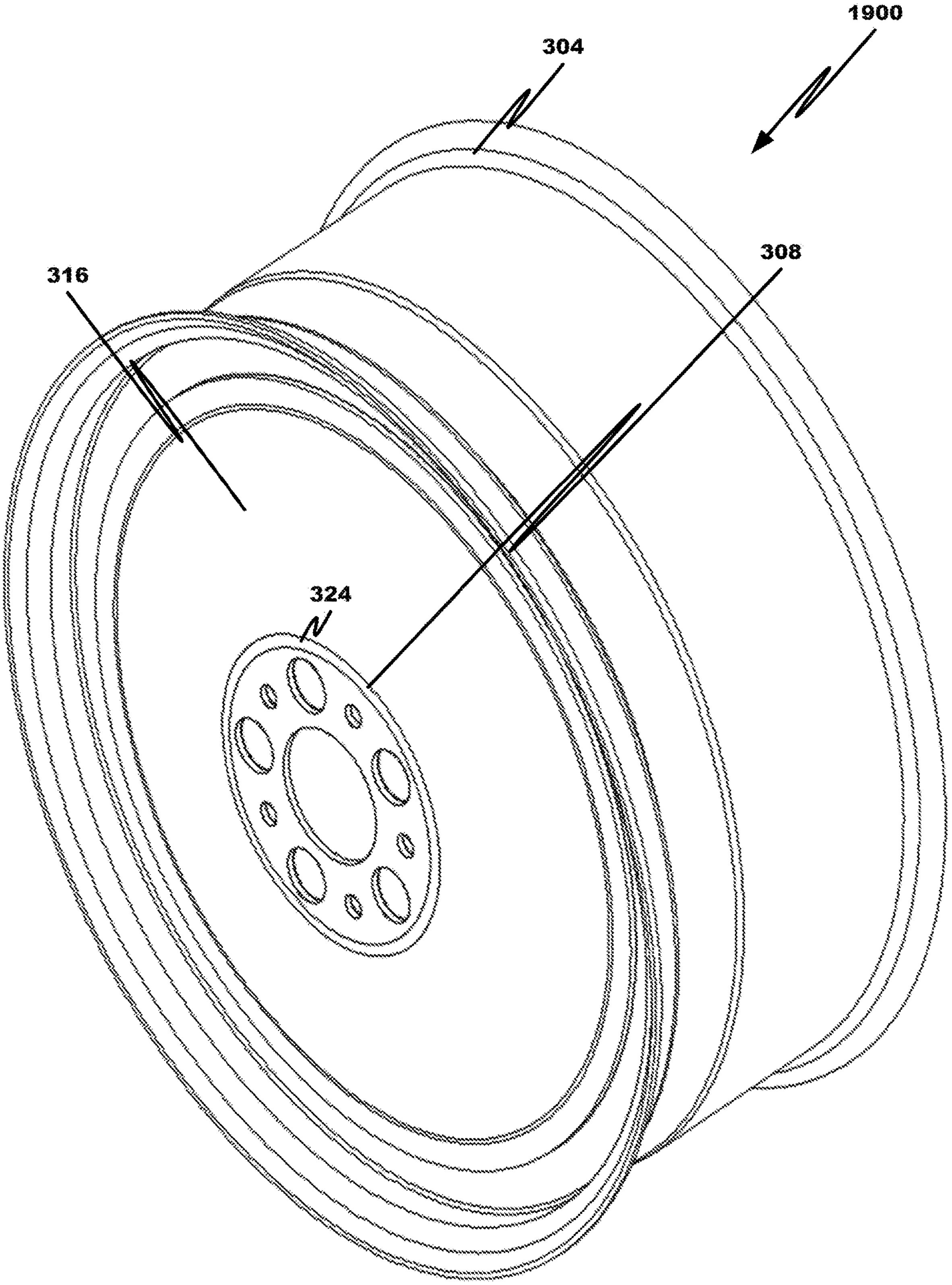
FIG. 22 is a front isometric view of a wheel according to an embodiment of the present disclosure.

With respect to FIGS. 19 and 21-22, wheels 1900 and 2100 are shown in cross section that are similar to the wheel of FIGS. 3-4 and 12-17 but have a different geometry in the flange area for increased hoop strength, integrates the curbside spoke member 316 and front lip or rim **304*a* into one-piece, integrates the inside spoke member 320 and rear lip or rim 304*b* into one-piece, in the case of the wheel 1900 bolts 1908 the two sections together with optional adhesive bonding therebetween, and has a different center section 324 and spacer geometry. As shown in FIG. 21, the two sections can alternatively be fusion welded, friction welded, etc. rather than being bolted and adhesively bonded. Most of the area of the substantially planar curbside surface 318 is in the rim plane formed by the inside edge 1904** of the rim.

Figure 20:
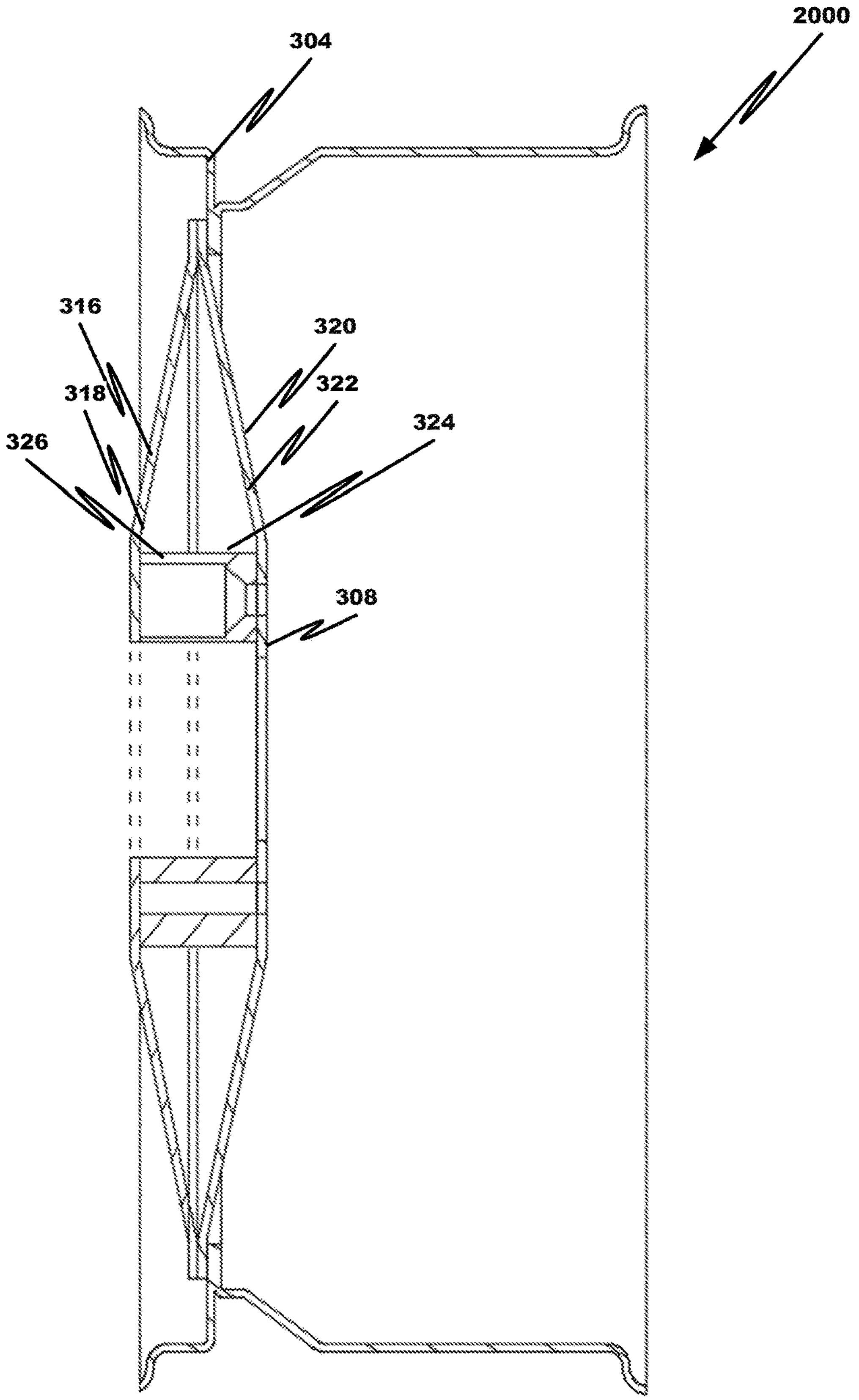
FIG. 20 is a cross-sectional view of a wheel according to an embodiment of the present disclosure.

With reference to FIG. 20, a wheel 2000 is shown in cross section that is similar to the wheel of FIGS. 3-4 and 12-17 but the curbside spoke member 316 is independent or discrete from the rim 304 or center section 324, the inside spoke member 320 is independent or discrete from the rim 304 or center section 324, and all of the various members, namely the spoke members 316 and 320, center section 324, and rim 304 are bolted together with optional adhesive bonding. The wheel 2000 further has a different center section and spacer geometry than the wheel of FIGS. 3-4 and 12-17 in that the triangle formed by the substantially planar curbside and inside spoke surfaces 318 and 322 and the center section surface 326 is an acute triangle.

Figure 23:
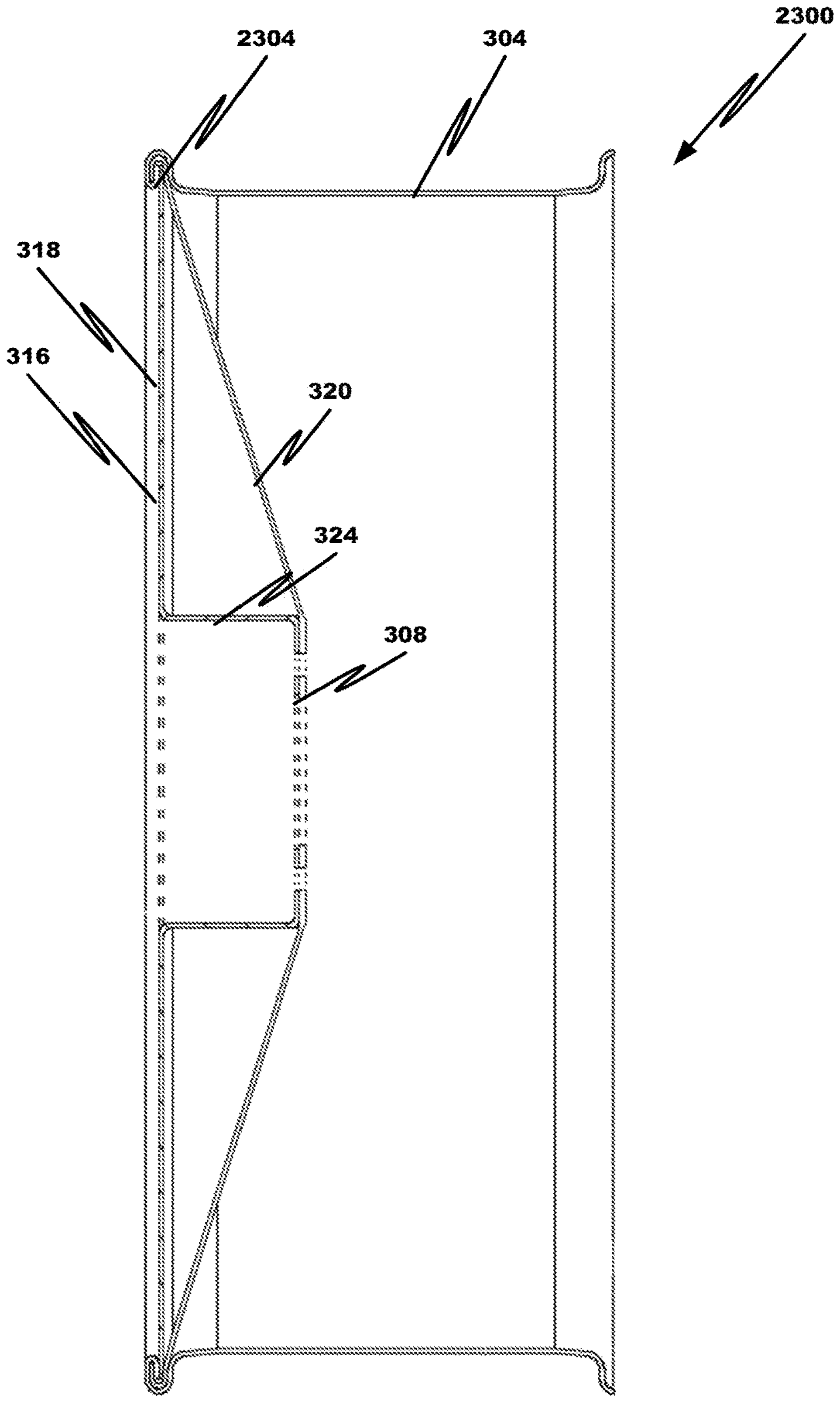
FIG. 23 is a cross-sectional view of a wheel according to an embodiment of the present disclosure.

With reference to FIG. 23, a wheel 2300 is shown in cross section that is similar to the wheel of FIGS. 3-4 and 12-17 but has no spacer or center section 324, uses deep drawn and spin formed sheet products as curbside and inside spoke members 316 and 320, fabricates the curbside and inside spoke members 316 and 320 using a double seam similar to soda can lid/cylinder joint (also called a double seam/double hem). While a double seam/double hem wheel is shown, a single hem/fold over wheel design may be envisioned based on the teachings of this disclosure. Most or all of the area of the substantially planar curbside surface 318 is in the rim plane formed by the inside edge 2304 of the rim.

Figure 25:
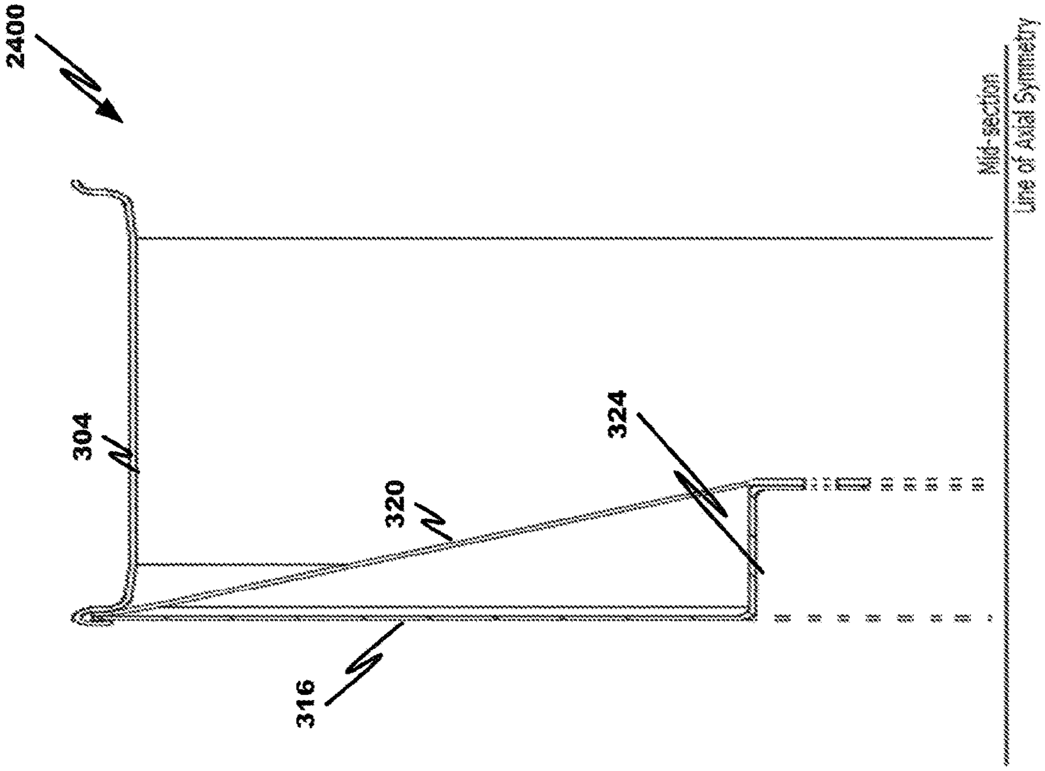
FIG. 25 is a partial cross-sectional view of a wheel according to an embodiment of the present disclosure.
Figure 24:
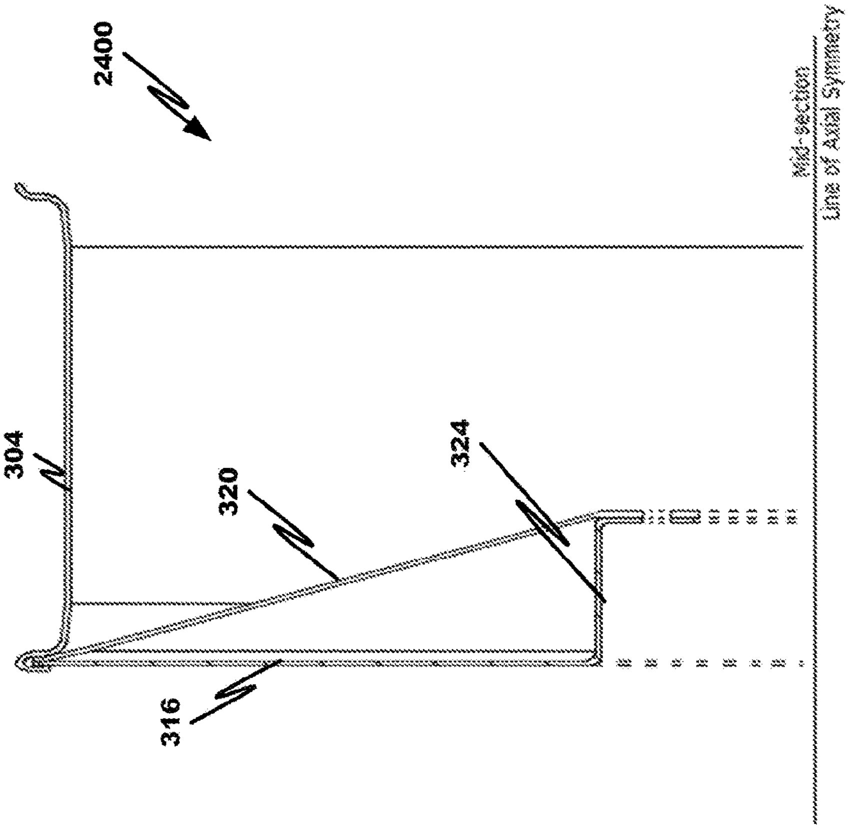
FIG. 24 is a partial cross-sectional view of a wheel according to an embodiment of the present disclosure.
Figure 26:
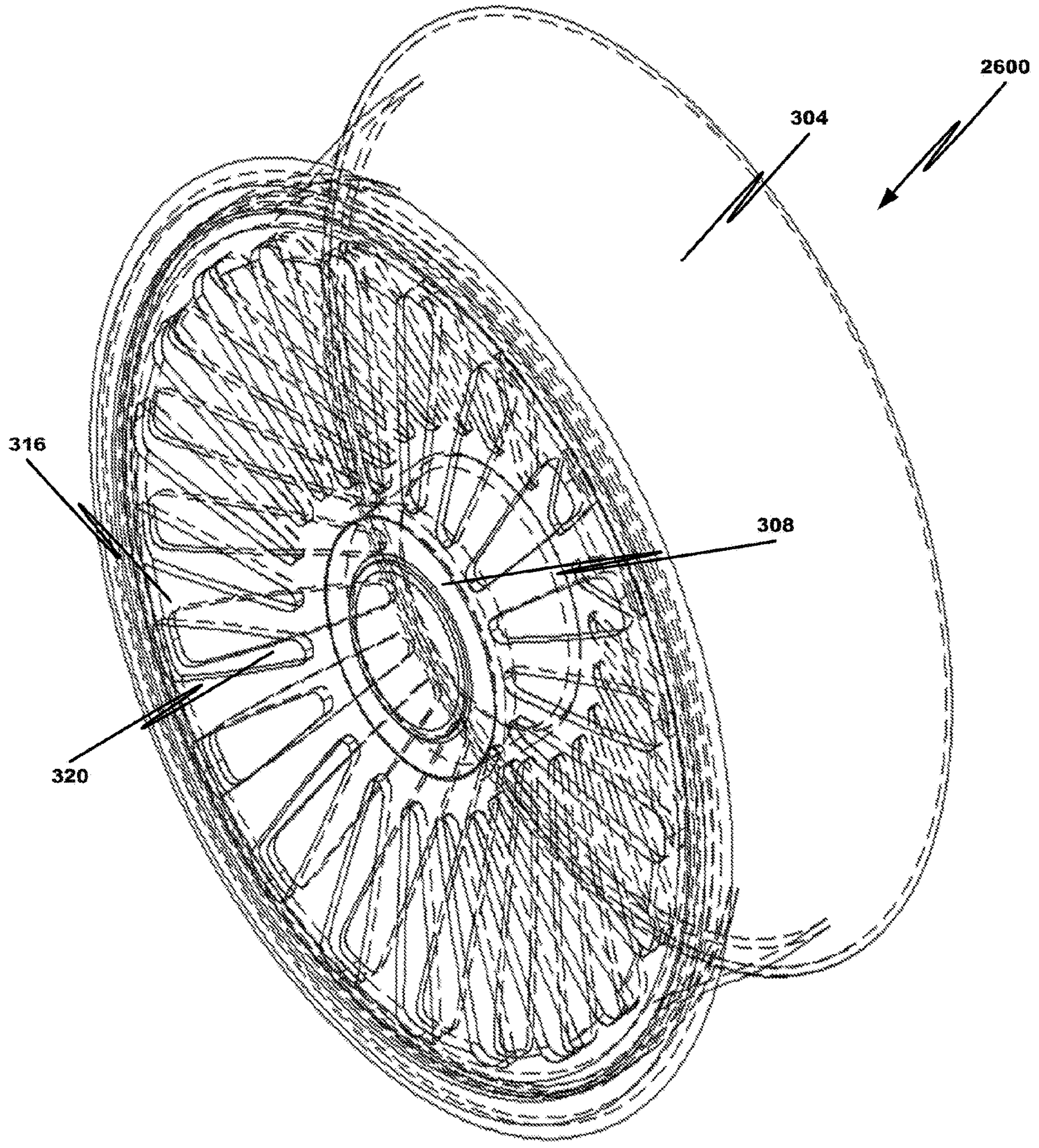
FIG. 26 is a front isometric view of a wheel according to an embodiment of the present disclosure.
Figure 27:
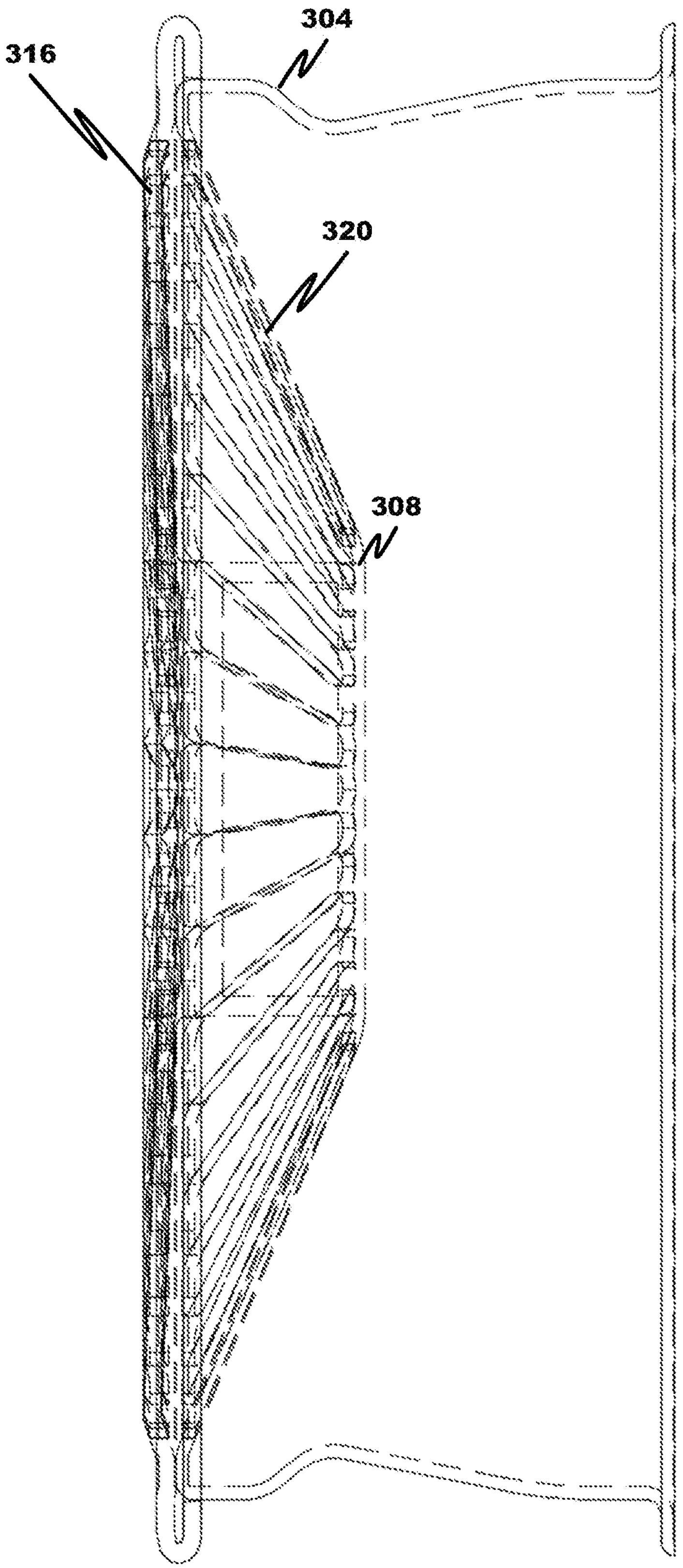
FIG. 27 is a cross sectional view of a wheel according to an embodiment of the present disclosure.
Figure 28:
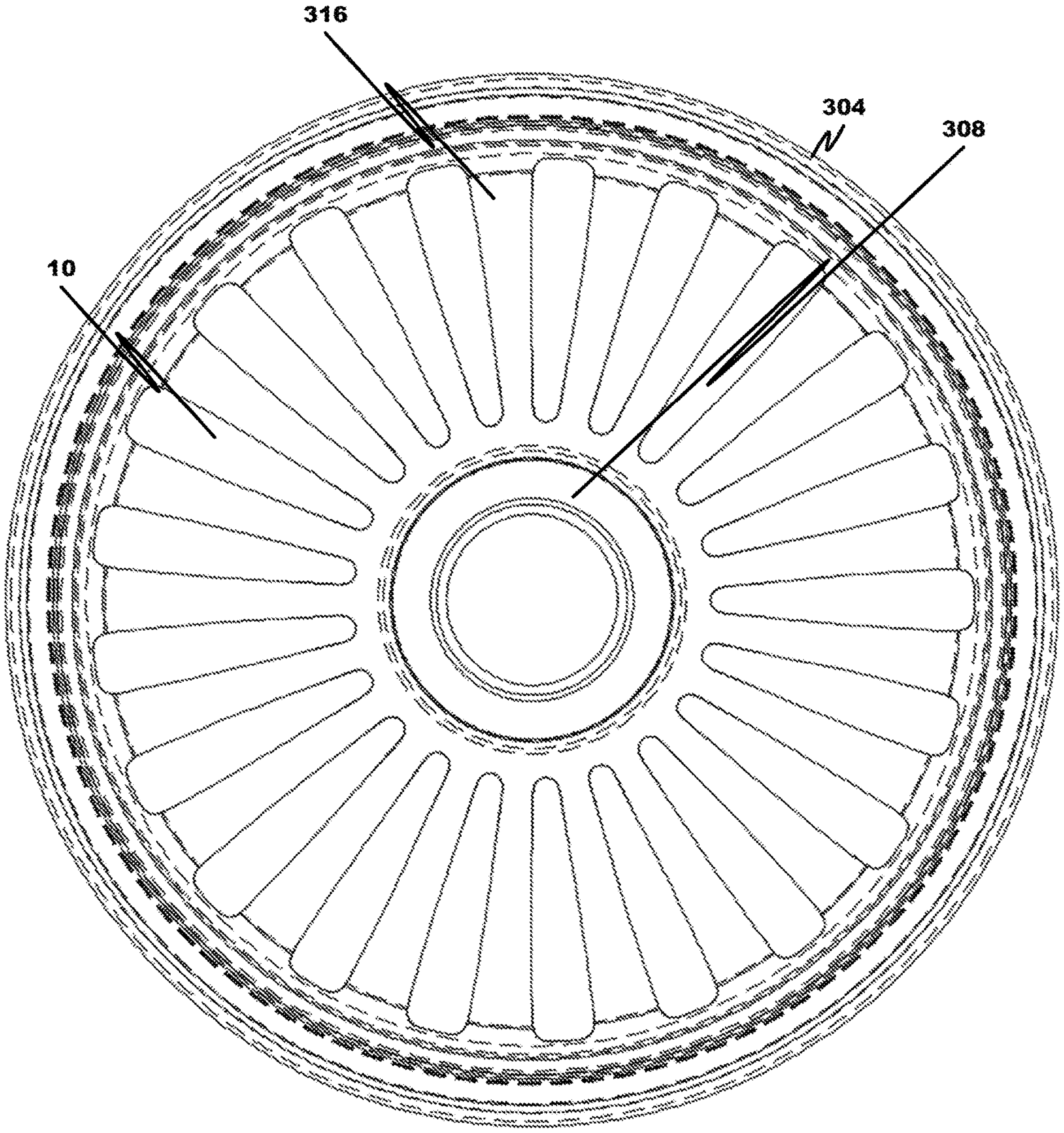
FIG. 28 is a side view of a wheel according to an embodiment of the present disclosure.
Figure 29:
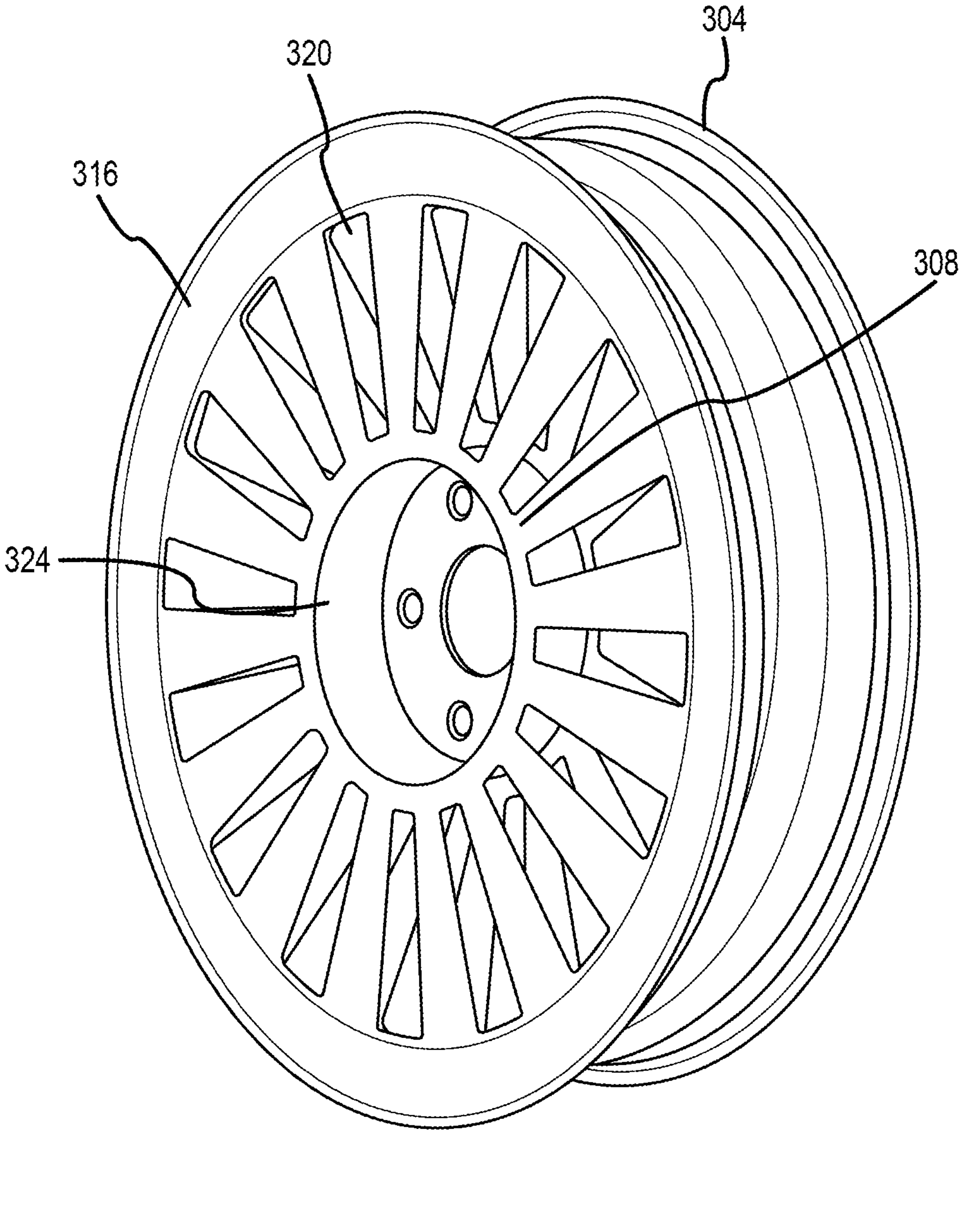
FIG. 29 is a front isometric view of a wheel according to an embodiment of the present disclosure.
Figure 33:
FIG. 33 is a view of a wheel according to an embodiment of the present disclosure.
Figure 34:
FIG. 34 is a view of a wheel according to an embodiment of the present disclosure.
Figure 35:
FIG. 35 is a view of a wheel according to an embodiment of the present disclosure.
Figure 36:
FIG. 36 is a view of a wheel according to an embodiment of the present disclosure.

With reference to FIGS. 24-25, a wheel 2400 is shown in half cross section that is similar to the wheel of FIGS. 3-4 and 12-17 but is fabricated by hemming the outer or curbside spoke member 316 of the wheel over both center sheets that make up the wheel disc 308. The spoke member 316 may be cut and prepared prior to the hemming process to prevent wrinkling. The spoke member 316 has a central deep drawn cup that acts as an integral center section 324 and functions as a spacer between the spoke member 316 and the inside spoke member 320.

With reference to FIG. 26-29, a wheel 2600 is shown that is a multi-spoke wheel having a curbside spoke member 316 that is folded over to bring the curbside and inside spoke members 316 and 320 to the outside position and employing an integrated center section 324.

FIGS. 32-36 depict other wheel embodiments incorporating the teachings of the present disclosure.

As can be seen from FIGS. 3-4 and 12-17, the basic wheel design categories can describe a full-face wheel design, in which the visual appearance is like an even plane with cut outs. The challenge in a full-face design is the extreme asymmetric positioning of the disc-module 308 versus the rim barrel 308. This can be unfavorable for the rim rigidity and force distribution. Further, the integration of the brake-system and suspension components add further geometrical constraints in regard to rim-wheel arrangement. To improve load distribution and stiffness the strategy below is suggested:

1. Brackets forming another triangle cross section comprised of segments of the inner-disc, rim and bracket. This load distribution element is close to the rim. Therefore, the load distribution element is not interfering with the brake system which is located close to the center-section of the disc. The load distribution element might be segmented in multiple singe brackets or a one-piece ring connecting the rim with the inner disc. The inner disc respectively rim might have forming elements integrated to allow best geometrical welding preparation for the bracket.
2. The inner disc is formed with iterated stiffening flanges. The inner disc/flange component creates together with outer rim and disc two triangular cross sections. The stiffening flanges in this design are limited to the rim near region, to avoid interfering with brake-system (package requirements). To fabricate the one-piece inner disc/flange component deep drawing and roll forming is preferably applied.
3. The design is similar to the first design option above, but the disc has a higher set back from the outer wheel front.
4. In the two-piece wheel version 2 sheets are deep-drawn, joint and calibrated in a final spin forming step
5. A three-piece version similar to the first design option but avoiding a triple-sheet joining situation.

Manufacturing and Material Options

Various joining options for the curbside and inside spoke members, center section, and rim are presented in FIG. 30.

There are a number of manufacturing and material options including:

1. Flat rolled sheet intense triangular structure for spoke and rim
2. Two-disc stamping: The rim is manufactured by conventional spin forming of sheet material. The two discs are stampings based on a sheet. To join the disc and rim, various joining methods can be applied like fusion welding (preferably MIG or Laser), friction based joining methods, adhesives or mechanical fastening. Respectively, a combination of different methods.

Below different design options, joining technologies and preparation of joint geometry are described. The geometrical outline of the weld faces can be important for optimum performance. The preferred designs are portrayed in below sketches.

Manufacturing Steps of the Rim

The rim is manufactured by spin-forming (conventional process). However, geometrical features might be applied to prepare the surface for joining.

Manufacturing Step of the Outer Disc

Stamping a circle, with optional cutting openings;

Forming/stretching the required shape and internal stress condition;

Calibrating and final edge trimming; and

Optionally surface preparation for joining.

Manufacturing Step of the Inner Disc

Stamping a circle, optional cutting openings;
Forming the required shape by deep drawing;
Calibrating and final edge trimming; and
Optionally surface preparation for joining.

Joining of Outer Disc and Inner Disc

Various options for the joining method are considered for the connection Rim/Double-Disc (RDD) and Inner/Outer-Disc (IOD) or Center Section/Double-Disc (CDD).

1. Mechanical fastening: The rim is formed with a bracket/flange to give space for the mechanical joining (e.g. bolt). The two discs will be bolt in the flat area where inner and outer disc are in contact. Optionally, the mechanical fastening will be supported by adhesives.
2. For the RDD, IOD joint respectively CDD joint various welding technologies can be considered, preferably friction-based welding process or fusion based technologies like MIG welding.

A preferred process for a triangulated wheel is friction welding. The welding process comprises consecutive phases: One component will be in relative rotational motion (rotor) to the second component (static). A defined pressure is applied. The relative motion and applied pressure generate temperature in the interface. The relative motion will be stopped while the pressure will be increased to allow a plastic flow forming a “friction joint”. Finally, after a holding phase the component will be slowly cooled under applied pressure. Multi-material joints (e.g. aluminum, stainless steel) may be applied to optimize performance and avoid cosmetic defects due to heat load in friction welding.

In the following paragraphs process sequences and geometrical sheet preparation are disclosed to ensure a low cost, optimum joining process and high joint quality.

RDD Joint

The present disclosure includes a “material reserve forming element” (MRM) which allows to insert the disc into the rim without interference of the two components and provides a favorable joining geometry form different friction welding technologies. Below, the principal function of the MRM element will be explained in more detail by an example in paragraph (1) below. The design of MRM elements is not limited to the example below. The general purpose of the MRM element is that the extra material is diverted in the way to apply a force during welding, respectively, to form-fit the double disc into a rim design element. The MRM element can also be applied to two “single” disc attachments into the rim forming the triangulated design.

Figure 5:
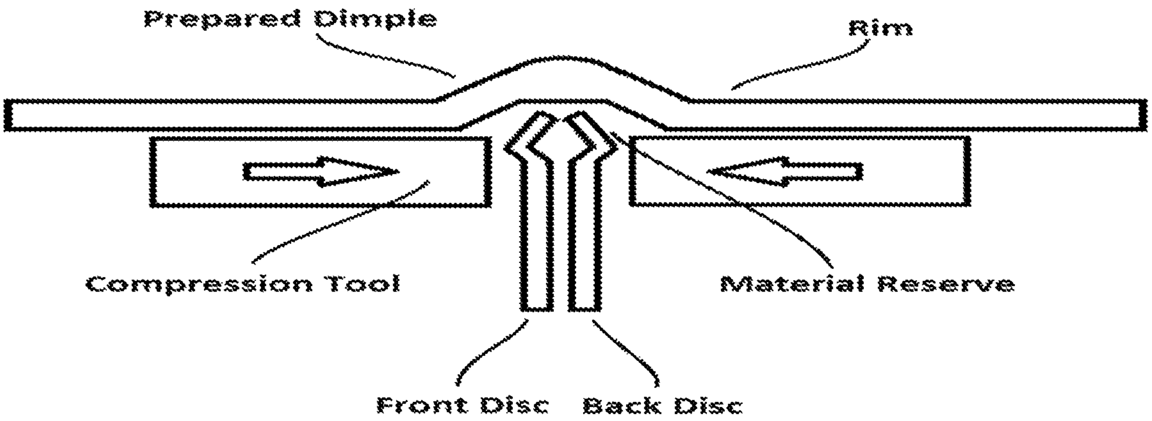
FIG. 5 is a schematic outline of a material reserve forming element according to embodiments of the disclosure.

With reference to FIG. 5, RDD joint in friction welding (rotational, vibrational or stir)—the joint plane is perpendicular to wheel axis:

1 The double disc outer perimeter is forming a straight edge as shown in FIG. 5 (where the “front disc” refers to the curbside spoke member 316 and the “back disc” refers to the inside spoke member 320);

2 Close or at the outer perimeter a forming element is pressed into the double “disc sheets” to provide “extra” material close to the perimeter. As shown in FIG. 5, the extra material, further called “material reserve forming element” is pushed against the rim surface in the later joining process. This excess material pushed against the rim provides the force needed during friction welding. The “material reserve forming element” will be enfolded by two tools oriented vertical to the sheet metal. Consequently, the double discs perimeter enlarges applying the friction welding force towards the rim. For the welding, preferably the double sheet is static and the rim moving (rotational or vibrational). Alternatively, the RDD joint can be realized by friction stir welding or a conventional MIG joint.

3 Since the initial perimeter is smaller than the final. The disc can be inserted in the rim without compromising/scratching the rim surface.

4 In-between the double disc close to the outer perimeter welding an adhesive might be applied to fill the gap (corrosion protection) and enhance the force/form-fit.

Figure 6:
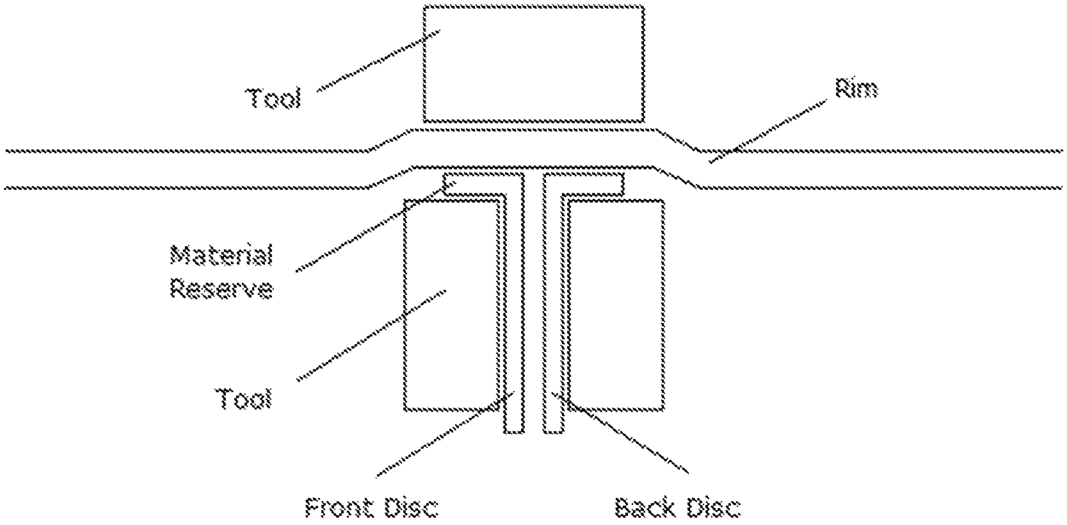
FIG. 6 is an alternative schematic outline of a material reserve forming element according to embodiments of the disclosure.

Another RDD joint in friction welding technique is shown in FIG. 6 (where "material reserve" references the MRM element). The double disc outer circumstances forming flange is shown in FIG. 6 as a joint plane perpendicular to wheel axis. Like in the prior case of FIG. 5, a forming element is applied to the double "disc sheets" to provide "extra" material close to the perimeter. This allows one to bring the disc into the surface of the rim and apply the pressure needed for spin welding. The "material reserve forming element" is pushed versus the prepared rim surface (flat dimple) in the later joining process by spin forming. The rim surface offers a suitable forming element (flat dimple) to take the extra double-disc material (pushed in by spin forming). This geometry offers a favorable joining geometry for the later friction welding process.

In another embodiment, the rim is forming flange and double disc is friction welded to the rim flange-joint plane parallel to wheel axis

IOD Joint

Rotational or vibrational friction welding is applied to the double disc connection. Preferably at least one sheet contains a pre-bow to ensure a well-defined proceeding of the friction welding process. A forming element might be applied to provide extra material in the joint if needed.

CDD Joint

The hub is attached to the center section of the double disc. In a rotational or vibrational friction welding process, the double disc is preferably static, and the hub rotates. Forces to support the friction weld are applied axial. Optionally, as the hub is the rotating element in rotational friction welding the hub surface geometry can be machined in the same set-up.

Figure 7:
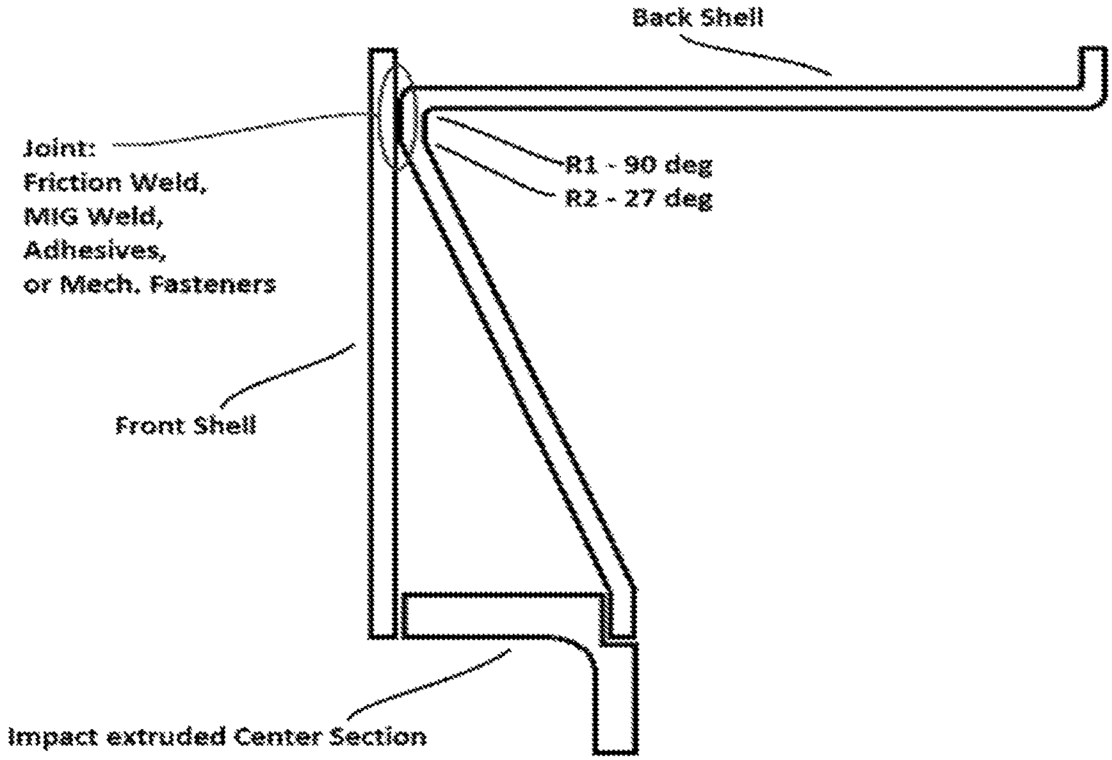
FIG. 7 depicts an embodiment for welding a 2-piece wheel friction weld according to embodiments of the present disclosure.

Front/back half-shell: As shown in FIG. 7, the wheel consists of two components where each component is manufactured starting with a metal sheet. The first component includes the front disc and the front rim fragment creating a front shell. The second component includes the back disc and the back-rim fragment creating a back shell. The manufacturing comprises following steps:

Manufacturing Steps of the First Component (Front Shell)

1. Stamping a circle, optional cutting openings;
2. Forming the required shape by deep drawing, optional cutting openings;
3. Finishing the shape by spin forming; and
4. Optionally surface preparation for joining.

Manufacturing Steps of the Second Component (Back Shell)

1. Stamping a circle, optional cutting openings;
2. Forming the required shape by deep drawing, material is placed where it is needed in the final product;
3. Optional cutting of openings;
4. Finishing the shape by spin forming; and
5. Optional surface preparation for joining.

The above sequence of forming and joining is an option, the manufacturing sequence can be reversed that joining will be prior to forming operation.

The first component and the second component will be combined to the fabricated wheel by joining methods like fusion welding, friction based joining methods or adhesive techniques.

Details Regarding Rotational a Friction Joining Method

Different design layouts can be rotation friction welded. Some, but not all of these design layouts are referenced in Table 2.

Figure 8:
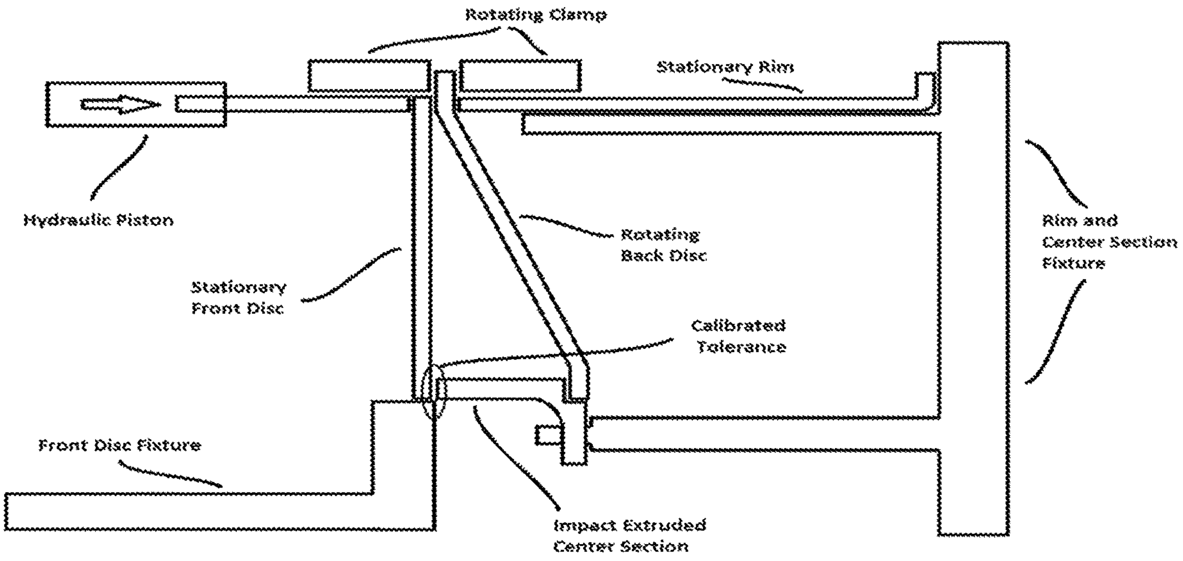
FIG. 8 depicts an example for a clamping arrangement in a 3-piece wheel for a friction weld according to embodiments of the present disclosure.

In the version depicted in FIG. 8, the wheel is fabricated from four components: rim, center section, front disk and back disc. The rim, front disc and center section are held stationary by fixtures. The back disk is held and spun by a rotating clamp that is driven by an inertia drive, direct drive or hybrid friction weld system. The back disc is held from the tire-bead-flange. After the back disc is brought to the needed rotational velocity, a hydraulic piston applies pressure against the outer perimeter of the front disc and thereby brings front disc, back disc, and rim into contact. The resultant friction heats the two interfaces and supplies the welding mechanism. The piston controls the friction welding force function.

The rim-to-discs weld is performed with the center section in place. All the parts are positioned in the fixtured with calibrated tolerances that account for the plastic deformation of any components during the weld process. In a secondary rotational friction weld process, the center section is jointed to the front and back disc. With the discs-to-center section tolerances now in specification after the first weld process, the center section is accelerated to the required rotational speed and pressure is applied to the discs to create friction weld conditions. A hydraulic piston controls the friction welding force function.

Details Regarding Friction Stir Welding

Figure 9:
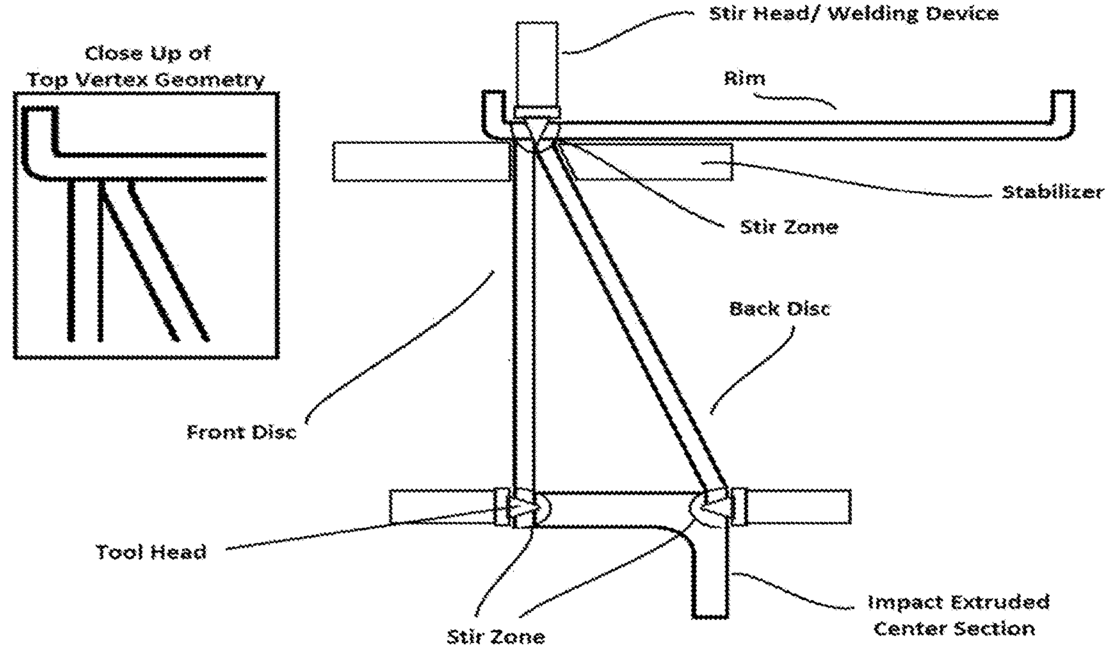
FIG. 9 depicts an example for a clamping arrangement in a 3-piece wheel for a friction weld to embodiments of the present disclosure.
Figure 10:
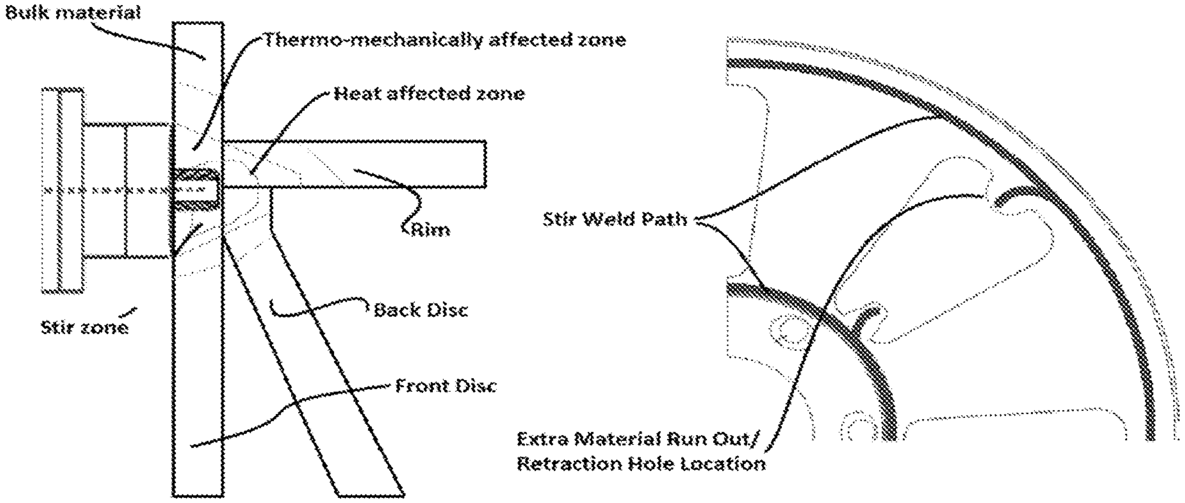
FIG. 10 depicts an example for a heat effected zone in a joining arrangement and example for heat stir weld path according to embodiments of the present disclosure.

Different design layouts can be friction stir welded. Some, but not all these design layouts are referenced in Table 2. In the version depicted in FIGS. 9 and 10, the wheel is fabricated from four components: rim, center section, front disk and back disc. For the top vertex joint, all components are held stationary relative to one another by fixtures. A friction stir welding (FSW) device is positioned at the outside face of the rim directly above the intersection point of the rim and the two discs. During the stir welding process, FSW parameters are such that the stir zone permeates all three components. The stir zone fully covers the rim-discs and disc-disc interfaces. The typical FSW end hole will either be filled in a secondary step, or the tool head is overlapped the weld region and slowly retracted independently of the collar. The center section to discs joints are performed in a similar process. The clamping die might be segmented in an appropriate method to allow removal of the component/die.

Details Regarding Adhesive Methods

Different design layouts can be rotation friction welded. Some, but not all of these design layouts are referenced in Table 2.

Details Regarding Mechanical Fastening

Different design layouts can be rotation friction welded. Some, but not all of these design layouts are referenced in Table 2.

Details Regarding Refill Friction Stir Spot Welding-Adhesive Bonding (RFSSW-AB)

Figure 11:
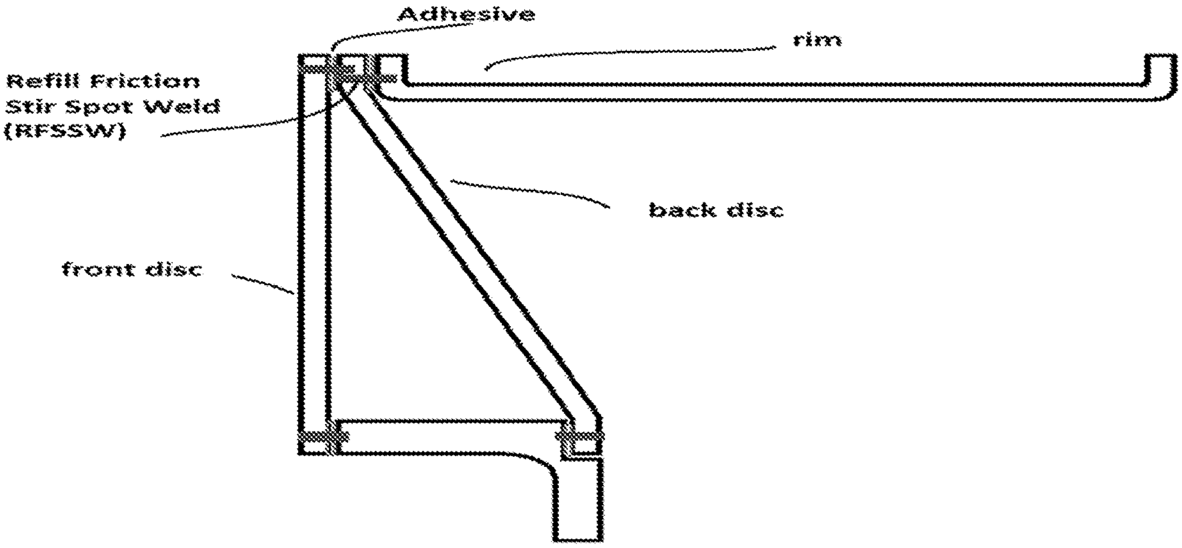
FIG. 11 depicts an example for a 3-piece wheel supported by adhesives for a friction weld.
Figure 12:
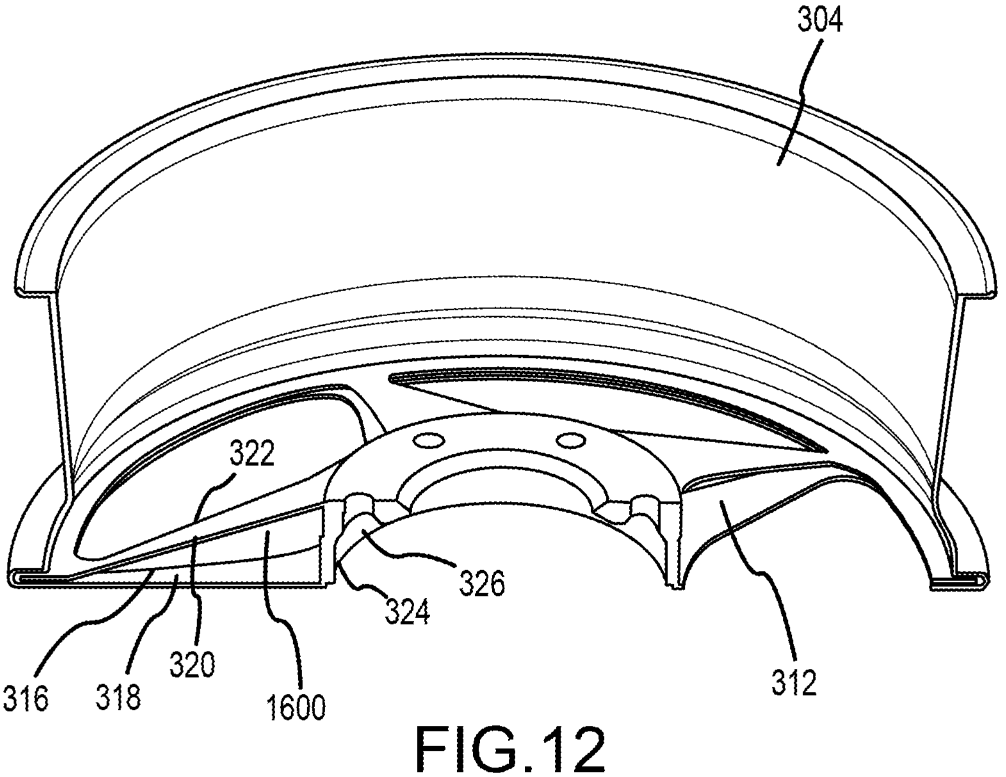
FIG. 12 is a bottom isometric cut-away view of a wheel according to an embodiment of the present disclosure.
Figure 13:
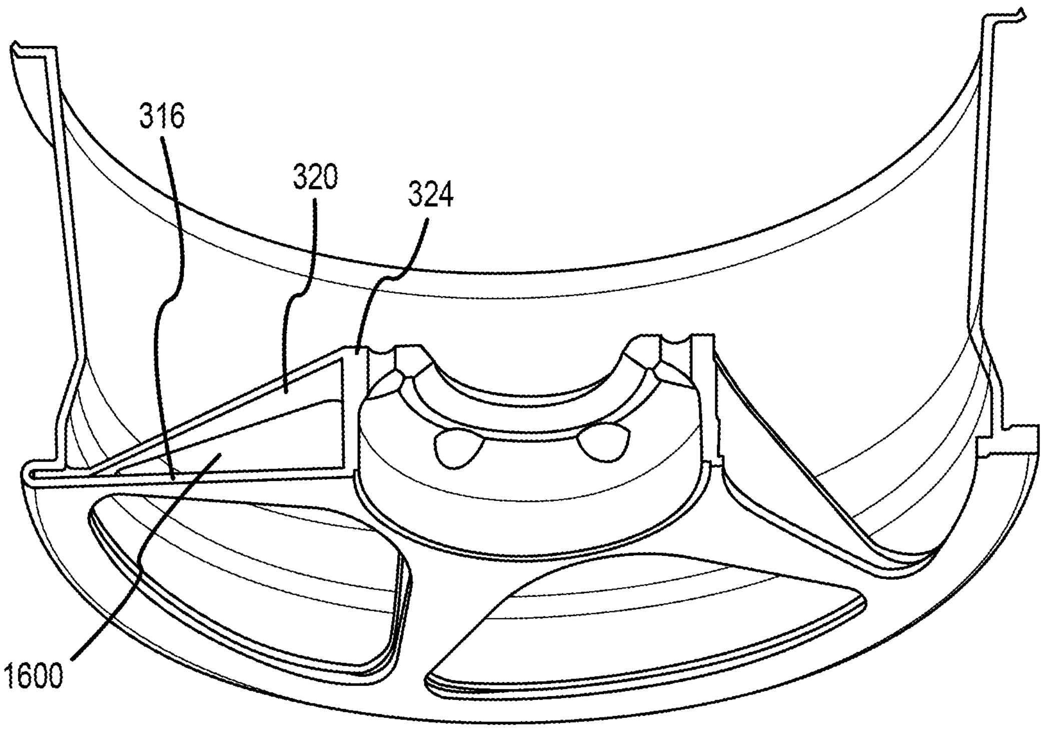
FIG. 13 is a top isometric cut-away view of a wheel according to an embodiment of the present disclosure.
Figure 14:
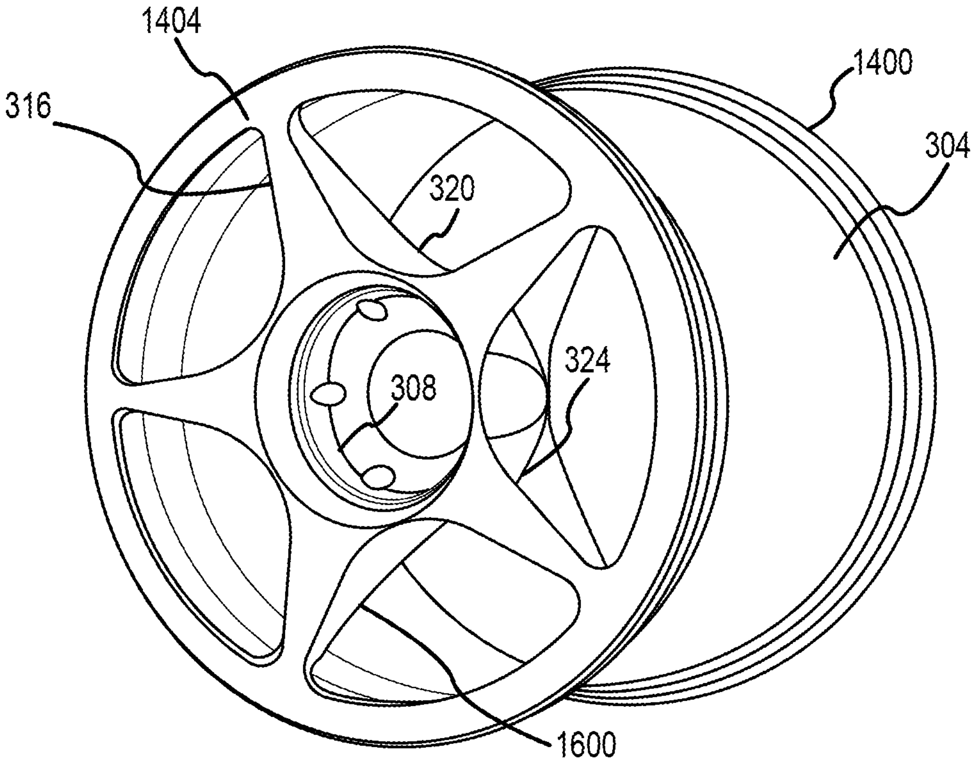
FIG. 14 is a front isometric view of a wheel according to an embodiment of the present disclosure.
Figure 15:
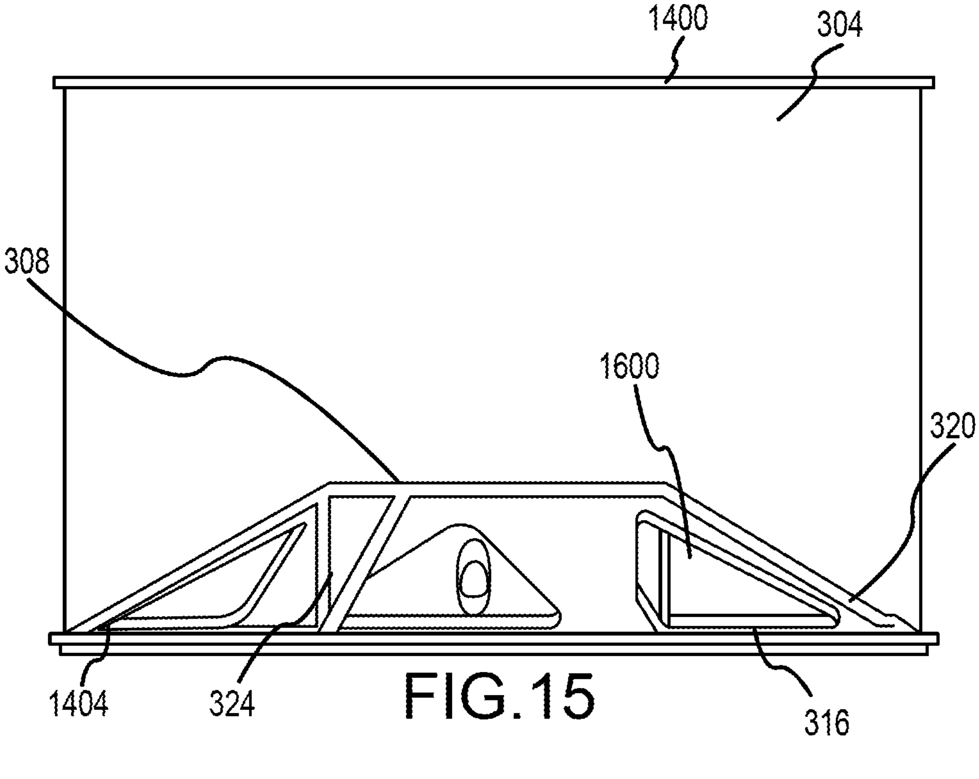
FIG. 15 is a cross-section of a wheel taken along a center line of the wheel according to an embodiment of the present disclosure.
Figure 16:
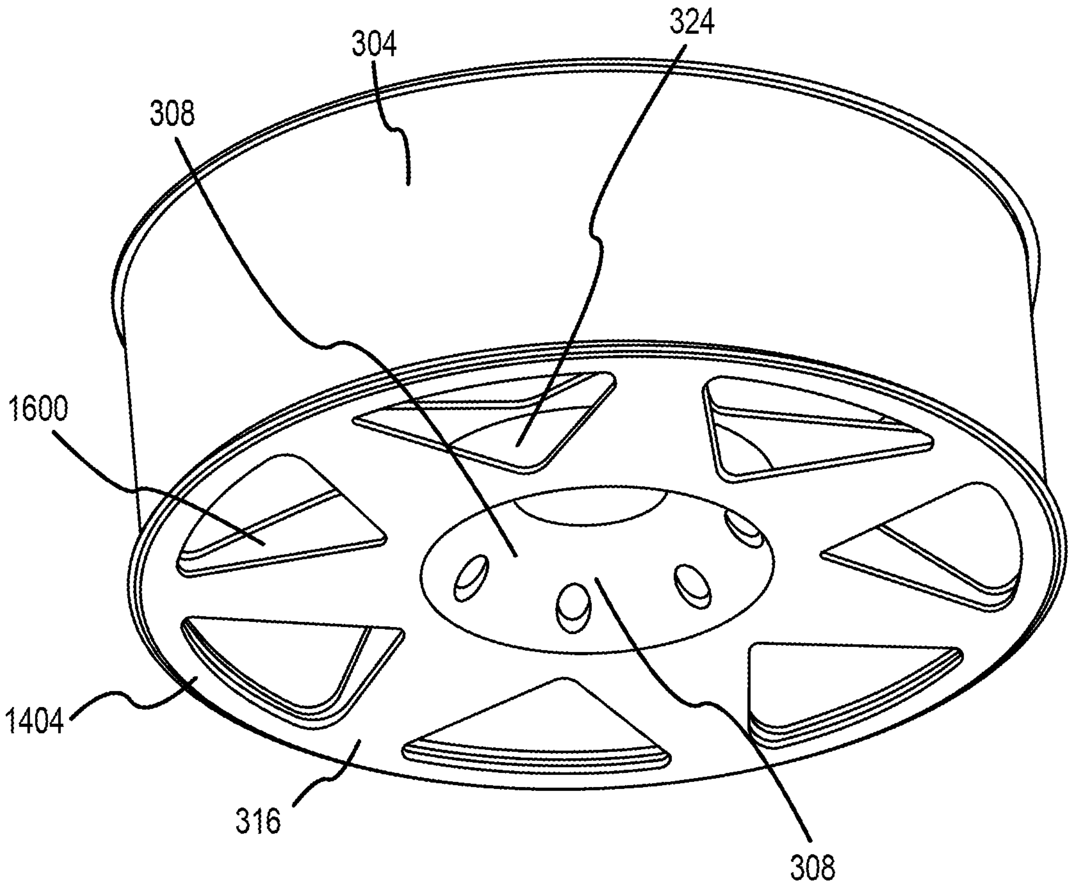
FIG. 16 is a top isometric view of a wheel according to an embodiment of the present disclosure.
Figure 17:
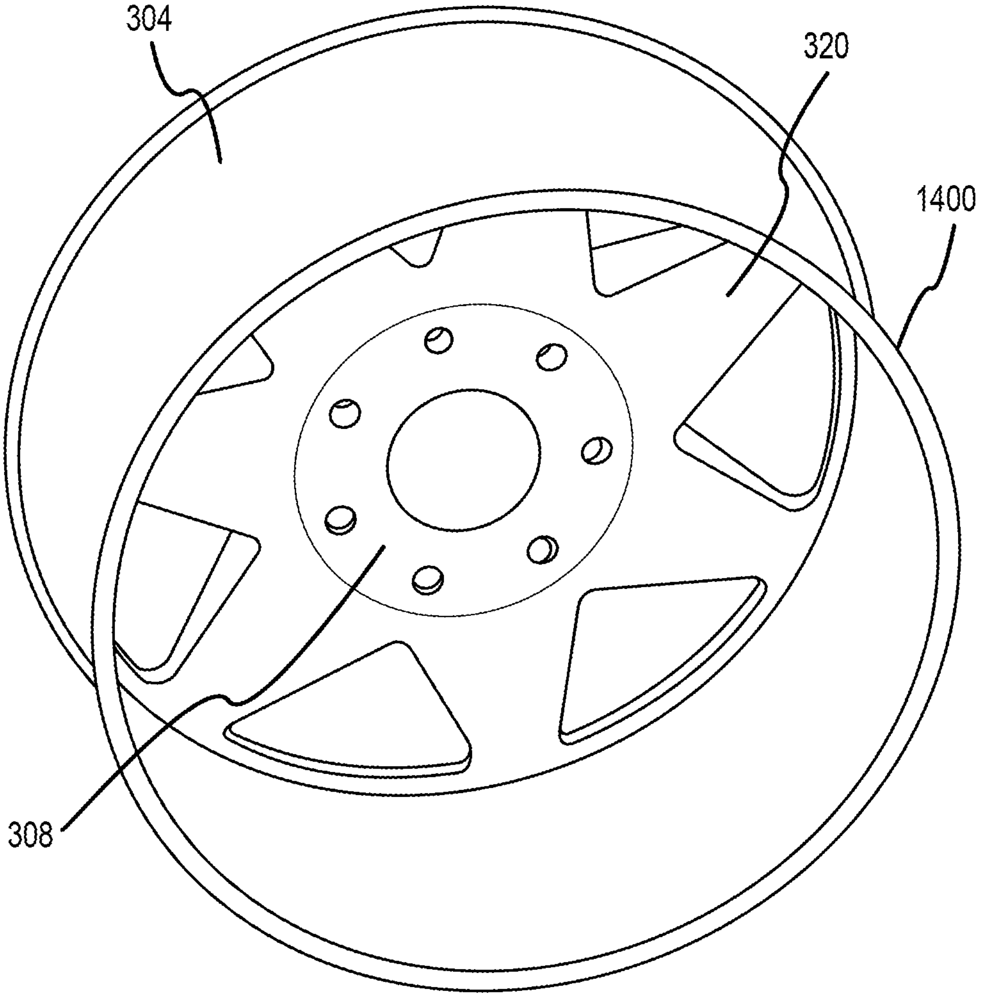
FIG. 17 is a rear isometric view of a wheel according to an embodiment of the present disclosure.

Referring to FIG. 11, different design layouts can be weld-bonded using RFSSW and adhesives. Some, but not all of these design layouts are referenced in Table 2.

Extrusion Intense Disc/Spike Trio-Design (Rim is Standard Spin Formed)

Mayor design component of the proposal is a triangular element (cross-sections) which can be manufactured in sheet, extrusion, casting or forging. One of the preferred methods is using extrusions.

One joining option is adhesive bonding. For safety reasons adhesive bonding is secured with a "mechanical fastening" method. In this extrusion intense version formfitting extrusion geometries will secure the adhesive bonding. The ability to design the joining section with undercut and using adhesive boding agents give best combination of form-fit and force-fit within the joints.

The triangular element (TE) can be arranged in two different ways.

The TE cross section perpendicular to the wheel plane.

The TE cross section is in the wheel plane.

The spoke structure can be manufactured from single or multiple extrusions. The wall thickness of the extrusion walls fitted to the design examples.

Figure 18:
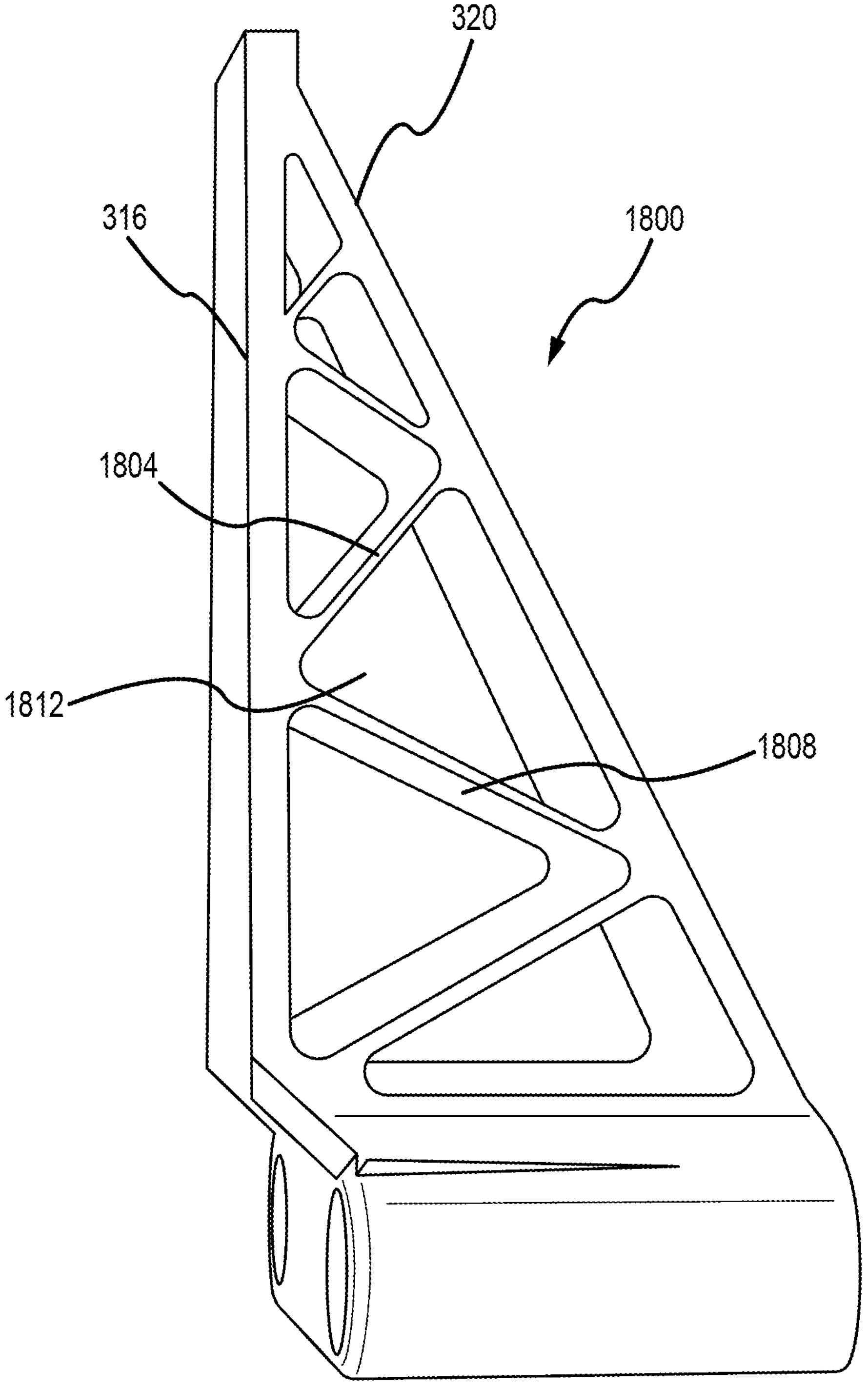
FIG. 18 is a cross-sectional view of a spoke having a truss-like network of support members according to an embodiment of the present disclosure.

FIG. 18 depicts, in cross section, a spoke 1800 using multiple triangles for added support. Each triangle 1812 comprises first and second cross members 1804 and 1808 to form a truss-like network of adjacent or stacked triangles interconnected for structural support of the curbside and inside spoke members 316 and 320.

Casting Intense Triangular Structure for the Disc Component of a Wheel

Multiple triangle cross-sections can significantly reduce stress levels in the material driving further weight reduction. For particularly complex shaped triangular spoke designs.

In this optional solution casting is the preferred production method of the disc. To allow complex shape sand cores can be prepared by 3-D printing.

Ultrafine Precipitation Hardening

Wheel alloys targeting higher strength, in particular higher fatigue strength. Therefore, the crack propagation needs to be limited. The levers are (1) grain boundaries or particles to stop the crack, (2) the crack preferably propagates at long paths while (3) low stresses should remain at the crack tip to limit propagation speed. This combination of microstructural features can be achieved by strengthening the "softer matrix" by ultrafine particles. Ultrafine particles can be introduced by external injection or by in-situ precipitation. The external injection can be done by adding non-metallic particles or high melting point intermetallics into the melt. For example, Graphene flakes can be added, preferably pre-alloyed in a Magnesium alloy. The ultrafine Graphene flakes improve specific strength, producibility (casting, extrusion) and reduces the overall weight.

In 6xxx alloys the precipitations are relatively coarse. Finer precipitations would provide a more efficient strengthening, allowing a softer matrix. The softer matrix is beneficial for fatigue behavior. Smaller (ultrafine) precipitations develop by applying constituents (elements) of slower diffusion characteristics compared to the Si—Mg based precipitations as containing amounts of Zr, Ag, Sn or Sc other rare earth metals as small additions (<0.5%), preferably 0.05 to 0.4% for Zr respectively 0.01-0.2% for Sc to conventional NHT and HT alloys. The mentioned elements can be added individually or in a combination. Where Zr has the highest content up to 0.45%, Sn up to 0.25% and Sc up to 0.15%. The addition of the above elements is beneficial in commercial heat-treatable alloys as well as in commercial non-heat-treatable alloys like 3xxx and 5xxx. Those usually non-heat treatable system become heat-treatable by the above additions, gaining significant strength in an aging process.

Forming at Elevated Temperatures

The required triangular elements can be formed at elevated temperatures to achieve tight radius and essential design elements. The ability to achieve more complex geometries reduces the number of joining operation to form a triangle cross section. The applied temperature depends on the material used. For example, steel (xx), 5xxxx (XX), 6xxx (xx) or 7xxx alloys. It further depends on the warm/hot forming process preferred for the specific geometry, forming at medium temperatures for steel or aluminum are considered as well as superplastic forming or quick plastic forming technology. The forming operation can be combined with solid solution annealing and successive quenching procedure in the forming die. Warm forming of T6 to in case aging during paint curing is generally not applicable.

Customized Al—Si—Mg Alloys

Typically aging is done as in a separate process or as the wheel-paint is cured

Carbon-Fiber

The carbon fiber triangular structure can be arranged in layers according to the predominant force distribution under load.

Aluminium-CFRP Hybrid Wheel

Carbon-Fiber Reinforced Polymers (CFRP) show very high tensile strength but are not appropriate to apply in bending or compression mode. Also, corrosion issues in combination with other wheel components are limitation the use. The design proposes the use of an appropriate alloy-CFRP combination respectively a connecter-components taking unsuitable stresses for CFRP and providing uncritical joint-solutions.

Sheet spikes made from Carbon-fiber reinforced polymers with machined "extrusion adapters" to allow the joint with rim and hub Isotropic ultra-thin "Carbon-Flakes" respectively "Graphene-Flakes" or Graphene-oxide flakes in a polymer matrix.

A number of variations and modifications of the disclosure can be used. It would be possible to provide for some features of the disclosure without providing others. For example, the sheet solutions above are not the only options for manufacturing the curbside and inside spoke members. With reference to FIGS. 31-32, a morphological box is depicted that provides various manufacturing techniques for extruded spoke members. The morphological box presents various concepts with added details not presented above.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A wheel for a vehicle, the wheel comprising:

a rim configured to receive a tire proximate to a surface defined between one or more tire bead seats of the rim, the rim including a plane that passes through a first portion of the surface, a cavity defined within the rim, and a second portion of the surface, the plane being spaced from a first end and a second opposite end of the rim; and a wheel disc connected to the rim, the wheel disc including a center section configured to engage an axle hub of the vehicle, the center section located in a portion of the wheel disc such that a hub contact surface of the center section is offset from the defined plane of the rim, wherein the wheel disc comprises one or more spokes extending outwardly from the center section of the wheel disc to the rim, each of the one or more spokes being formed by a curbside spoke member having a planar curbside spoke surface at the first end of the wheel and an inside spoke member having a planar inside spoke surface, wherein outer ends of the curbside and inside spoke members engage the rim and inner ends of the curbside and inside spoke members engage the center section of the wheel disc, wherein the planar curbside and inside spoke surfaces are oriented transversely to each other and to a surface portion of the center section lying between the planar curbside and inside spoke surfaces to define a triangle, and wherein a plane of the triangle is parallel to a center axis of the disc, and wherein the wheel is one of at least four wheels configured to be installed on the vehicle.

2. The wheel of claim 1, wherein the triangle reduces bending forces in a member near zone, wherein the triangle is a right triangle and wherein the inside spoke surface is perpendicular to the surface portion of the center section and wherein the length of the inside spoke member can be determined from the lengths of the curbside spoke member and portion of the center section using the Pythagorean theorem.

3. The wheel of claim 1, wherein the triangle reduces bending forces in a member near zone, wherein the triangle is an Isosceles right triangle and wherein the inside spoke member is the same length as the curbside spoke member and wherein the length of each of the inside and curbside spoke members is longer than a length of the portion of the center section.

4. The wheel of claim 1, wherein the triangle reduces bending forces in a member near zone, wherein the triangle is an acute triangle and wherein the inside spoke member, the curbside spoke member, and the portion of the center section have different lengths.

5. The wheel of claim 1, wherein the wheel is a fabricated wheel with reduced bending forces in the inside and curbside spoke members, thereby reducing tension stress in member near zone of the spoke, and wherein each of the inside and curbside spoke members are sheet or extrusion products made from metal or non-metal material, and wherein each of the inside and curbside spoke members are flat rolled products comprised of high strength steel or aluminum wrought material.

6. The wheel of claim 1, wherein the wheel is a fabricated wheel with reduced bending forces in the inside and curbside spoke members, thereby reducing tension stress in member near zone of the spoke, wherein each of the inside and curbside spoke members are sheet or extrusion products made from metal or non-metal material, wherein the extrusion products are a high strength aluminum wrought material, and wherein the wheel comprises a non-metal material comprised of reinforced plastic based on fibers or flakes made of carbon, graphite or graphene or graphene oxides constituents.

7. The wheel of claim 1, wherein the center axis is an axis of symmetry of the disc, wherein the center axis is parallel to an interconnected axle of the vehicle, wherein the triangle is a right triangle, wherein the curbside spoke surface is perpendicular to the surface portion of the center section, wherein a length of the curbside spoke member is less than a length of the inside spoke member and the lengths of the inside and curbside spoke members are longer than a length of the portion of the center section, and wherein a normal vector of the triangle is directed in a wheel rotational trajectory to resist the side forces.

8. The wheel of claim 1, wherein the center axis is an axis of symmetry of the disc, wherein the center axis is parallel to an interconnected axle of the vehicle, wherein the triangle is a right triangle, wherein the curbside spoke surface is perpendicular to the surface portion of the center section, wherein a length of the curbside spoke member is less than a length of the inside spoke member and the lengths of the inside and curbside spoke members are longer than a length of the portion of the center section, and wherein the triangle has a plane vector perpendicular to a rotational trajectory of the wheel to resist forces while accelerating or de-accelerating the vehicle.

9. The wheel of claim 1, wherein each of the inside and curbside spoke members are comprised of flat rolled products in steel or aluminum, which are cut and 3-dimensional deformed, wherein, for each of the inside and curbside spoke members, a variance of stress distribution across a thickness of the inside or curbside spoke members is less than about 50 percent center to surface variance, while a thickness of the inside or curbside spoke cross-section member does not exceed about 5 mm at a thickest cross section with reference to aluminum sheet alloy based on a wheel load of 800 Kg.

10. The wheel of claim 1, wherein each of the inside and curbside spoke members are comprised of extruded products in aluminum, which are cut and 3-dimensional deformed, and wherein, for each of the inside and curbside spoke members, a variance of stress distribution across a thickness of the inside or curbside spoke members is less than about 50 percent center to surface variance, while a thickness of the inside or curbside spoke cross-section member does not exceed about 5 mm at a thickest cross section with reference to aluminum sheet alloy based on a wheel load of 800 Kg.

11. The wheel of claim 1, wherein each of the inside and curbside spoke members are comprised of fabricated profiles from steel or reinforced plastic, which are cut and 3-dimensional deformed, and wherein, for each of the inside and curbside spoke members, a variance of stress distribution across a thickness of the inside or curbside spoke members is less than about 50 percent center to surface variance, while a thickness of the inside or curbside spoke cross-section member does not exceed about 5 mm at a thickest cross section.

12. The wheel of claim 1, wherein each of the inside and curbside spoke members is made of sheet material and is fabricated from cut and preformed sheets, and wherein the inside and curbside spoke members, center section, and rim are welded, mechanically fastened, connected by an adhesive, held in position by fit formed geometry, or connected by a combination thereof.

13. The wheel of claim 1, wherein the wheel is fabricated by friction stir welding and wherein a material reserve forming element is created close to an outer perimeter of the disc to be pushed against an inner rim member, and wherein, for each of the inside and curbside spoke members, a variance of stress distribution across a thickness of the inside or curbside spoke members is less than about 50 percent center to surface variance, while a thickness of the inside or curbside spoke cross-section member does not exceed about 5 mm at a thickest cross section with reference to aluminum sheet alloy based on a wheel load of 800 Kg.

14. The wheel of claim 1, wherein the inside and curbside spoke members is made of sheet material and center section are made of extrusions, in which the disc consists of multiple cut and preformed extrusions and wherein the multiple cut and preformed extrusions are: welded, mechanically fastened, connected by adhesive, held in position by fit formed geometry, or by a combination thereof.

15. The wheel of claim 1, wherein the disc and rim are made of two sheets, a first sheet forming partially the rim and disc at a side of the suspension and a second sheet forming an outer side of the rim and disc, and wherein the inside spoke member is formed by the first sheet and the curbside spoke member is formed by the second sheet.

16. The wheel of claim 1, wherein the disc and rim are made of two sheets, a first sheet forming partially the rim and disc at a side of the suspension and a second sheet forming an outer side of the rim and disc and wherein the first sheet is fabricated by deep drawing and a final calibration by radial forming operation like spin-forming.

17. The wheel of claim 1, wherein the disc and rim are made of two sheets, a first sheet forming partially the rim and disc at a side of the suspension and a second sheet forming an outer side of the rim and disc and wherein the second sheet is manufactured by deep-drawing and a calibration by radial forming operation like spin-forming.

18. The wheel of claim 1, wherein the disc and rim are made of two sheets, a first sheet forming partially the rim and disc at a side of the suspension and a second sheet forming an outer side of the rim and disc, wherein the partially formed rim and disc at a side of the suspension and the outer side of the rim and disc are connected by welding, mechanically fastened, connected by an adhesive, or connected by a combination thereof, and wherein a final calibration process is applied after assembly of the partially formed rim and disc at a side of the suspension and the outer side of the rim and disc and wherein the calibration is performed by a radial forming operation like spin-forming.

19. The wheel of claim 1, wherein one or more of the curbside spoke member, inside spoke member and center section is formed by deep drawing and is one of:

warm formed at temperatures at 7xxx at least at 150° C.,
warm formed at temperatures at 6xxx at least at 150° C. in T6,
warm formed at temperatures at 5xxx at least at 150° C., or
cryogenic formed at temperatures as low as −150° C. or below.

20. The wheel of claim 1, wherein an outer sheet-component of the wheel is used as a design element revealing a full-face layout of the planar curbside spoke surface, wherein the inside and curbside spoke members is formed from a flat sheet, wherein the flat sheet is one or more of painted, laminated, polished, and a combination thereof, wherein the outer sheet-component of the wheel is used for ventilation to dissipate heat from the inner to the outer sector of the wheel, wherein the spoke members comprise one or more cut-outs utilized forming the full-face layout, and wherein the cut-outs are formed in a manner to enhance turbulent flow in the inner section of the wheel.

21. The wheel of claim 1, wherein the spoke members are optimized for reduced drag resistance by reducing a number of cut-outs in the spoke members and reducing a distance of a set back of the outer disc to a rim edge, wherein the triangular spoke provides increased force distribution that allows the use of apply high strength materials by micro-alloying based on a reduced vertical stress component in the member, with a crack propagation that is less critical as compared to conventional fabricated wheel, wherein the outer disc comprises ballistic armor plate made from monolithic metal or composite material or multilayers, and wherein the perimeter of the outer disc can exceed the rim diameter to protect a tire engaging the wheel.

22. The wheel of claim 1, wherein at least one of:

the wheel-load is transferred from the outer rim to the inner supporting structure by a press-fit, the inner structure consists of spokes members in triangular design to avoid welded or mechanical joints being compromised by load peaks, the rim component consists of a conventional spin-formed sheet or a casting, the spokes comprise the triangular members, the load bearing press-fit is be secured respectively locked up by fusion welds, adhesives, mechanical joins, bolds or sealing tapes that do not limit the wheel load, or the rim/spoke interface reveals geometrical characteristics creating a form-fitting interleaving feature to accommodate the stresses in the press-fit, including geometrical features that are:

cast cavities for cast rims, drawn elements for sheet rims, cut-outs for sheet rims, or a reinforced flat interface press fit; and wherein at least one of:

wherein the spokes are pushed by means of expansion mechanism into a form-fit characteristic of the rim, wherein the expansion mechanism is integrated in the center section and uses inclined planes to transfer axial into radial movements, and wherein the radial movement pushes the spoke into the form-fit feature.

* * * * *